United States Patent
O'Shaughnessy et al.

(10) Patent No.: US 11,290,352 B2
(45) Date of Patent: Mar. 29, 2022

(54) MESSAGE ROUTING OPTIMIZATION SYSTEM

(71) Applicant: Twilio Inc., San Francisco, CA (US)

(72) Inventors: Jamie O'Shaughnessy, Surrey (GB); Riivo Kikas, Tartu (EE); Kaarel Kitsemets, Uuesalu (EE)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 17/130,831

(22) Filed: Dec. 22, 2020

(65) Prior Publication Data

US 2021/0344575 A1 Nov. 4, 2021

Related U.S. Application Data

(60) Provisional application No. 63/017,359, filed on Apr. 29, 2020.

(51) Int. Cl.
  *G06F 15/16* (2006.01)
  *H04L 41/5022* (2022.01)
  *H04L 45/00* (2022.01)

(52) U.S. Cl.
  CPC .......... *H04L 41/5022* (2013.01); *H04L 45/14* (2013.01)

(58) Field of Classification Search
  None
  See application file for complete search history.

(56) References Cited

U.S. PATENT DOCUMENTS

| | | | |
|---|---|---|---|
| 8,355,316 B1 | 1/2013 | Lushear et al. | |
| 10,939,256 B1* | 3/2021 | Shcherbakov | H04L 51/14 |
| 2009/0003269 A1 | 1/2009 | Kumazawa et al. | |
| 2011/0166958 A1 | 7/2011 | Hamilton, II et al. | |
| 2013/0022186 A1 | 1/2013 | Blackwell et al. | |
| 2014/0031070 A1* | 1/2014 | Nowack | H04L 29/06176 455/466 |

(Continued)

FOREIGN PATENT DOCUMENTS

| | | |
|---|---|---|
| EP | 3334214 A1 | 6/2018 |
| WO | 9428683 | 12/1994 |

(Continued)

OTHER PUBLICATIONS

"International Application Serial No. PCT/US2021/019396, International Search Report dated Jun. 9, 2021", 5 pgs.

(Continued)

*Primary Examiner* — Phyllis A Book
(74) *Attorney, Agent, or Firm* — Schwegman Lundberg & Woessner, P.A.

(57) ABSTRACT

Disclosed are systems, methods, and non-transitory computer-readable media for message routing optimization. The message routing optimization system receives requests to transmit messages to recipient devices. The message routing optimization system determines whether to allocate the messages to an optimal routing provider or a secondary routing provider. The message routing optimization ranks the set of routing providers based on a conversion rate index and determines the optimal routing and secondary routing providers based on the ranking. The message routing optimization system allocates messages to the selected routing providers to be delivered to their intended recipients.

20 Claims, 12 Drawing Sheets

(56) References Cited

U.S. PATENT DOCUMENTS

| | | | |
|---|---|---|---|
| 2015/0131444 A1* | 5/2015 | Malatack | H04M 7/0024 |
| | | | 370/235 |
| 2015/0381648 A1* | 12/2015 | Mathis | H04L 63/1425 |
| | | | 726/22 |
| 2017/0041213 A1 | 2/2017 | Nadalin et al. | |
| 2018/0219818 A1* | 8/2018 | Kramer | G06N 7/005 |
| 2020/0252343 A1* | 8/2020 | Popescu | H04L 43/0864 |
| 2021/0264489 A1 | 8/2021 | Chen et al. | |

FOREIGN PATENT DOCUMENTS

| | | |
|---|---|---|
| WO | WO97011553 A1 * | 9/1996 |
| WO | 2006069039 | 6/2006 |
| WO | WO-2021173655 A1 | 9/2021 |
| WO | WO-2021222914 A1 | 11/2021 |

OTHER PUBLICATIONS

"International Application Serial No. PCT/US2021/019396, Written Opinion dated Jun. 9, 2021", 8 pgs.
"International Application Serial No. PCT/US2021/070269, International Search Report dated Jul. 1, 2021", 4 pgs.
"International Application Serial No. PCT/US2021/070269, Written Opinion dated Jul. 1, 2021", 6 pgs.

\* cited by examiner

MESSAGE ROUTING OPTIMIZATION SYSTEM

CROSS-REFERENCE TO RELATED APPLICATIONS

This application claims the benefit of priority of U.S. Provisional Application No. 63/017,359, filed on Apr. 29, 2020, which is incorporated herein by reference in its entirety.

TECHNICAL FIELD

An embodiment of the present subject matter relates generally to message routing and, more specifically, to message routing optimization.

BACKGROUND

Routing providers provide message delivery functionality to customers. For example, routing providers charge customers a fee for each message delivered by the routing provider to an intended recipient by the routing provider. Customers may select which routing provider to use based on the performance provided by the routing providers. For example, customers may select a routing provider based on how likely it is that a message transmitted by the routing provider will be successfully delivered to its intended recipient.

Currently the process of selecting a routing provider is performed manually. For example, a human reviewer analyzes data indicating performance of the available routing providers and adjust use of the routing providers to optimize performance. This manual process is both resource intensive and slow as relies on human reviewers to both monitor the data and make adjustments. Accordingly, improvements are needed.

SUMMARY

A message routing optimization system monitors performance of multiple routing providers and allocates messages to the routing providers to optimize message routing performance. For example, the message routing optimization system allocates messages to the routing providers based on a conversion rate index that includes individual conversion rates determined for each routing provider. Each conversion rate indicates a performance level of a routing provider, such as by indicating an estimated likelihood that a message allocated to the routing provider will be successfully delivered to its intended recipient. The message routing optimization system allocates messages to the routing providers based on the conversion rate index, such as by allocating messages to the routing provider with the highest conversion rate. Messages are therefore allocated to the routing provider that is determined to provide the highest level or performance, thereby optimizing message routing performance.

The message routing optimization system calculates each conversion rate based on feedback data for each routing provider. The feedback data may include both live feedback data and testing feedback data. Live feedback describes each routing provider's performance delivering messages that have been allocated to the routing provider by the message routing optimization system. For example, the live feedback data can include data describing whether the routing provider transmitted the allocated message to its intended recipient, whether the message was successfully received by its intended recipient, whether the message resulted in a specified action by the recipient, an amount of time that elapsed until the message was transmitted by the routing provider, an amount of time that elapsed until the message was received by the recipient, and the like.

The testing feedback data describes the tested performance of the routing providers. For example, tests of a routing provider's network can be conducted during which test messages and/or synthetic messages are transmitted using routes provided by the routing provider. The testing feedback data describes the tracked performance of the test messages, such as whether the test messages were transmitted, received and/or resulted in a specified response, as well as the elapsed time for the test messages to be transmitted and/or received.

The message routing optimization system calculates a conversion rate for each routing provider based on the feedback data for the routing provider. The resulting conversion rate indicates the performance level of the routing provider, such as by indicating the likelihood that a message allocated to the routing provider will be successfully delivered to its intended recipient.

While selecting the routing provider with the highest conversion rate is key to providing optimized performance, the performance of the individual routing providers fluctuates over time and should be continually reassessed to maintain optimal performance. Accordingly, the message routing optimization system allocates messages to the routing providers with the mixed goals of achieving both exploitation of the optimal routing provider that is determined to provide the best performance based on the conversion rate index, and exploration of the secondary routing providers that are determined be providing lesser performance (e.g., lower than the optimal routing provider) based on the conversion rate index. Allocating messages for exploration purposes provides updated feedback data that is used to update the conversion rates and determine which routing provider is performing the best.

The message routing optimization system balances allocation of messages for exploration and exploitation purposes to provide optimized message routing performance. For example, the message routing optimization system attempts to maximize the number of messages allocated to the optimal routing provider, while also allocating enough messages to the secondary routing providers to allow for proper performance assessment of the routing providers.

To this end, the message routing optimization system allocates a portion of the messages to the optimal routing provider to exploit the higher performance provided by the optimal routing provider, and allocates another portion of the messages to the secondary routing providers to explore the performance provided by the secondary routing providers. For example, the message routing optimization system may allocate a certain percentage of the messages to each of the secondary routing providers for exploration purposes, with the remaining messages being allocated to the optimal routing provider. For example, the message routing optimization system may allocate 3% of the messages to each secondary routing provider for exploration purposes. Accordingly, in a case in which there are 5 total routing providers, 3% of the messages are allocated to each of the 4 secondary routing providers (e.g., 12% total), while the remaining 88% of the messages are allocated to the optimal routing provider.

To further encourage exploration, the message routing optimization system may allocate the messages to the routing providers based on an upper confidence bound estimate of the conversion rates for the routing providers. An upper confidence bound estimate provides an optimistic estimate of the performance of each routing provider, such as a most optimistic conversion rate for the routing provider based on the amount feedback data available. As the upper confidence bound estimate is based on available feedback data, the upper confidence bound estimate for routing providers with limited feedback data is amplified due to the limited amount feedback data available. For example, the upper confidence bound estimate for a routing provider with limited feedback may initially start very high, however will begin to fall as additional feedback data is gathered. Using the upper confidence bound estimate causes the message routing optimization system to allocate messages to routing providers with limited feedback data, resulting in better estimates in the performance of each routing provider.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
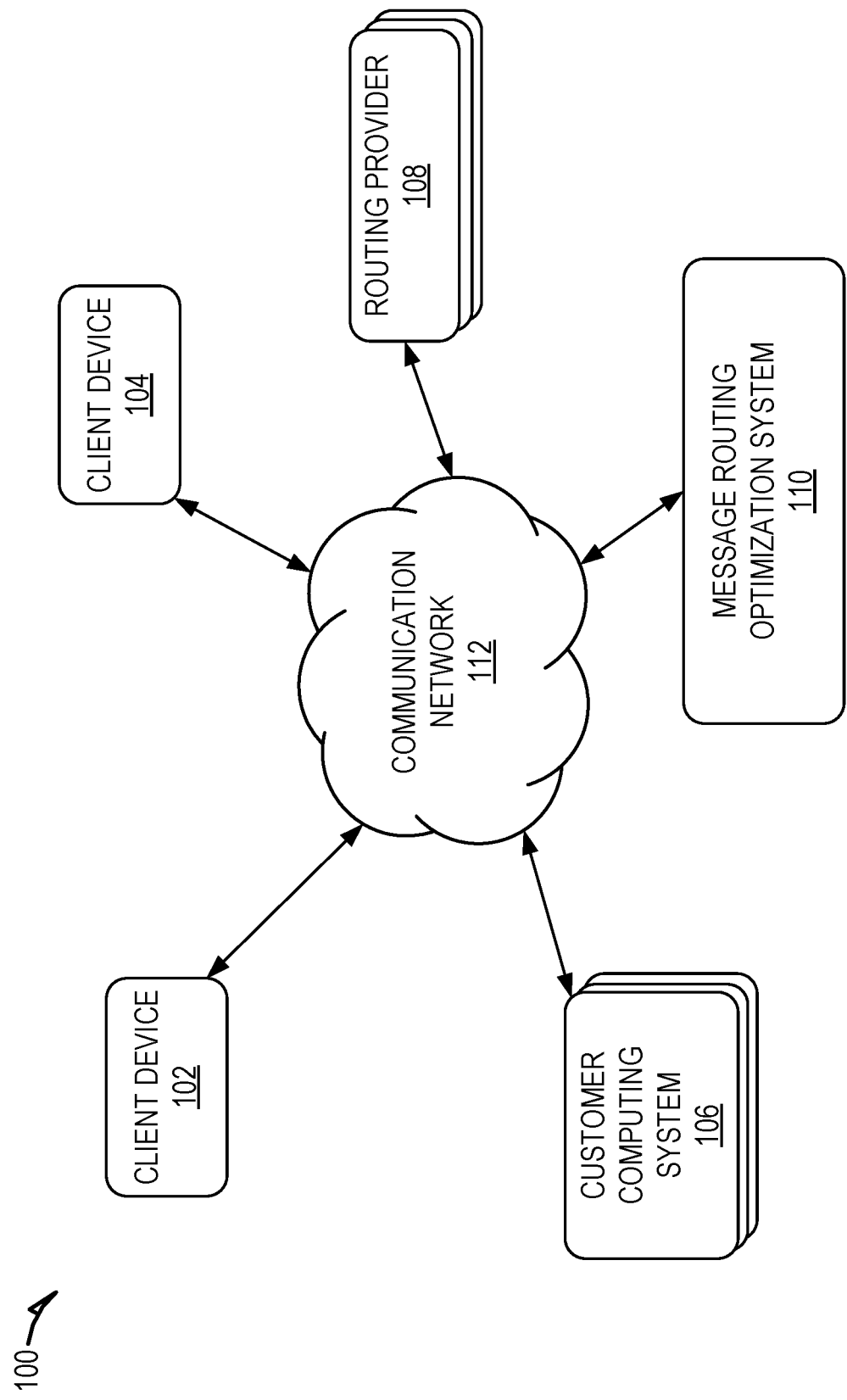
FIG. 1 shows a system for message routing optimization, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for message routing optimization. A message routing optimization system monitors performance of multiple routing providers and allocates messages to the routing providers to optimize message routing performance. For example, the message routing optimization system allocates messages to the routing providers based on a conversion rate index that includes individual conversion rates determined for each routing provider. Each conversion rate indicates a performance level of a routing provider, such as by indicating an estimated likelihood that a message allocated to the routing provider will be successfully delivered to its intended recipient. The message routing optimization system allocates messages to the routing providers based on the conversion rate index, such as by allocating messages to the routing provider with the highest conversion rate. Messages are therefore allocated to the routing provider that is determined to provide the highest level or performance, thereby optimizing message routing performance.

Use of the message routing optimization system for message optimization provides several technical benefits. For example, optimization of message routing increases the overall message conversion rate. In other words, the message routing optimization system causes an increase in the percentage of messages that are successfully delivered to their intended recipients. As a result, data communication performance is increased. Improving the conversion rate also reduces the number of messages that are retransmitted, thereby reducing underlying computing system resource usage.

FIG. 1 shows a system 100 for message routing optimization, according to some example embodiments. As shown, multiple devices (i.e., client device 102, client device 104, customer computing system 106, routing provider 108 and message routing optimization system 110) are connected to a communication network 112 and configured to communicate with each other through use of the communication network 112. The communication network 112 is any type of network, including a local area network (LAN), such as an intranet, a wide area network (WAN), such as the internet, a telephone and mobile device network, such as cellular network, or any combination thereof. Further, the communication network 112 may be a public network, a private network, or a combination thereof. The communication network 112 is implemented using any number of communication links associated with one or more service providers, including one or more wired communication links, one or more wireless communication links, or any combination thereof. Additionally, the communication network 112 is configured to support the transmission of data formatted using any number of protocols.

Multiple computing devices can be connected to the communication network 112. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1200 shown in FIG. 12.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The customer computing system 106 is one or more computing devices associated with a customer of the message routing optimization system 110. A customer may be a person, business, company, and/or any other type of entity that uses the services provided by message routing optimization system 110 to transmit communication messages to intended recipients. A communication message may be any of a variety of types of messages that are transmitted to a receiving client device 102 with the purpose of being presented to a user of the client device 102, such as by being displayed on a display of the client device 102. For example, a communication message may be a text-based message, such as a Short Message Service (SMS) message, a multimedia-based message, such as a Multimedia Messaging Service (MMS) message, and the like.

The customer may use the functionality of the message routing optimization system 110 as part of a service provided by the customer. The customer may provide any type of service, such as a banking service, travel service, retail service, and the like. The service may be an online and/or offline service. That is, the service may be available only online, such as an online retailer, offline, such as a physical retailer, or both online and offline, such as a retailer that provides a website or application as well as a physical retail store.

The customer computing system 106 may facilitate any service of a customer that is provided online, such as a ride-sharing service, reservation service, retail service, news service, and the like. In these types of embodiments, users may interact with the customer computing system 106 to utilize the online service provided by the customer. Users communicate with and utilize the functionality of the customer computing system 106 by using the client devices 102 and 104 that are connected to the communication network 112 by direct and/or indirect communication. The customer computing system 106, however, does not have to provide an online service that is accessible to users. That is, the customer computing system 106 may simply be a computing system used by a customer to perform any type of functionality.

Although the shown system 100 includes only two client devices 102, 104 and one customer computing system 106, this is only for ease of explanation and is not meant to be limiting. One skilled in the art would appreciate that the system 100 can include any number of client devices 102, 104 and/or customer computing systems 106. Further, each customer computing system 106 may concurrently accept communications from and initiate communication messages and/or interact with any number of client devices 102, 104, and support connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with a customer computing system 106 via a client-side application installed on the client devices 102 and 104. In some embodiments, the client-side application includes a component specific to the customer computing system 106. For example, the component may be a stand-alone application, one or more application plug-ins, and/or a browser extension. However, the users may also interact with the customer computing system 106 via a third-party application, such as a web browser or messaging application, that resides on the client devices 102 and 104 and is configured to communicate with the customer computing system 106. In either case, the client-side application presents a user interface (UI) for the user to interact with the customer computing system 106. For example, the user interacts with the customer computing system 106 via a client-side application integrated with the file system or via a webpage displayed using a web browser application.

A customer may use a customer computing system 106 to cause transmission of communication messages (e.g., SMS messages) to intended recipients. For example, a customer computing system 106 may provide online functionality that enables users of the customer computing system 106 to transmit messages to agents of the customer and/or other users. As another example, the customer computing system 106 may transmits messages to users to provide the users with two-factor authentication, password resets, updates, links to content, promotions, etc.

A routing provider 108 provides message delivery functionality. For example, a routing provider 108 maintains communication routes that may be used to transmit messages to their intended recipient client devices 102, 104. A routing provider 108 may charge a customer a fee for each message of the customer that is delivered by the routing provider 108.

The system 100 may include any number of routing providers 108, each of which may provider varying levels of performance. For example, the likelihood that a message will be successfully delivered may vary among the routing providers 108 as well as the individual routes provided by the routing provides 108. Further, the performance of each routing provider 108 may vary over time. Accordingly, the likelihood that a message will be delivered successfully varies based on the routing provider 108 and/or route selected to deliver the message. As such, varying selection of the routing provider 108 based on performance may provide a higher overall likelihood that messages are successfully delivered.

The message routing optimization system 110 provides functionality to optimize message routing performance for customers. For example, the message routing optimization system 110 monitors performance of multiple routing providers 108 and allocates messages to the routing providers 108 to optimize message routing performance. For example, the message routing optimization system 110 allocates messages to the routing providers 108 based on a conversion rate index that includes individual conversion rates determined for each routing provider 108. Each conversion rate indicates a performance level of a routing provider 108, such as by indicating an estimated likelihood that a message allocated to the routing provider will be successfully delivered to its intended recipient. The message routing optimization system 110 allocates messages to the routing providers 108 based on the conversion rate index, such as by allocating messages to the routing provider 108 with the highest conversion rate. Messages are therefore allocated to the routing provider 108 that is determined to provide the highest level or performance, thereby optimizing message routing performance.

The message routing optimization system 110 calculates each conversion rate based on feedback data for each routing provider 108. The feedback data may include both live feedback data and testing feedback data. Live feedback describes each routing provider's 108 performance delivering messages that have been allocated to the routing provider 108 by the message routing optimization system 110. For example, the live feedback data can include data describing whether the routing provider 108 transmitted the allocated message to its intended recipient, whether the message was successfully received by its intended recipient, whether the message resulted in a specified action by the recipient, an amount of time that elapsed until the message was transmitted by the routing provider 108, an amount of time that elapsed until the message was received by the recipient, and the like.

The testing feedback data describes the tested performance of the routing providers 108. For example, tests of a routing provider's 108 network can be conducted during which test messages and/or synthetic messages are transmitted using routes provided by the routing provider 108. The testing feedback data describes the tracked performance of the test messages, such as whether the test messages were transmitted, received and/or resulted in a specified response, as well as the elapsed time for the test messages to be transmitted and/or received.

The message routing optimization system 110 calculates a conversion rate for each routing provider 108 based on the feedback data for the routing provider 108. The resulting conversion rate indicates the performance level of the routing provider 108, such as by indicating the likelihood that a message allocated to the routing provider 108 will be successfully delivered to its intended recipient.

While selecting the routing provider 108 with the highest conversion rate is key to providing optimized performance, the performance of the individual routing providers 108 fluctuates over time and should be continually reassessed to maintain optimal performance. Accordingly, the message routing optimization system 110 allocates messages to the routing providers 108 with the mixed goals of achieving both exploitation of the optimal routing provider 108 that is determined to provide the best performance based on the conversion rate index, and exploration of the secondary routing providers 108 that are determined be providing lesser performance (e.g., lower than the optimal routing provider 108) based on the in the conversion rate index. Allocating messages for exploration purposes provides updated feedback data that is used to update the conversion rates and determine which routing provider 108 is performing the best.

The message routing optimization system 110 balances allocation of messages for exploration and exploitation purposes to provide optimized message routing performance. For example, the message routing optimization system 110 attempts to maximize the number of messages allocated to the optimal routing provider 108, while also allocating enough messages to the secondary routing providers 108 to allow for proper performance assessment of the routing providers 108.

To this end, the message routing optimization system 110 allocates a portion of the messages to the optimal routing provider 108 to exploit the higher performance provided by the optimal routing provider 108, and allocates another portion of the messages to the secondary routing providers 108 to explore the performance provided by the secondary routing providers 108. For example, the message routing optimization system 110 may allocate a certain percentage of the messages to each of the secondary routing providers 108 for exploration purposes, with the remaining messages being allocated to the optimal routing provider 108. For example, the message routing optimization system 110 may allocate 3% of the messages to each secondary routing provider 108 for exploration purposes. Accordingly, in a case in which there are 5 total routing providers 108, 3% of the messages are allocated to each of the 4 secondary routing providers 108 (e.g., 12% total), while the remaining 88% of the messages are allocated to the optimal routing provider 108. Allocated 3% of the messages to the secondary routing providers 108 is just one example an is not meant to be limiting. The message routing optimization system 110 may allocated any percentage of the messages to the secondary routing providers 108, such 1%, 2%, and the like.

To further encourage exploration, the message routing optimization system 110 may allocate the messages to the routing providers 108 based on an upper confidence bound estimate of the conversion rates for the routing providers 108. An upper confidence bound estimate provides an optimistic estimate of the performance of each routing provider 108, such as a most optimistic conversion rate for the routing provider 108 based on the amount feedback data available. As the upper confidence bound estimate is based on available feedback data, the upper confidence bound estimate for routing providers 108 with limited feedback data will be amplified due to the limited amount feedback data available. For example, the upper confidence bound estimate for a routing provider 108 with limited feedback may initially start very high, however will begin to fall as additional feedback data is gathered. Using the upper confidence bound estimate causes the message routing optimization system 110 to allocate messages to routing providers with limited feedback data, resulting in better estimates in the performance of each routing provider 108.

Figure 2:
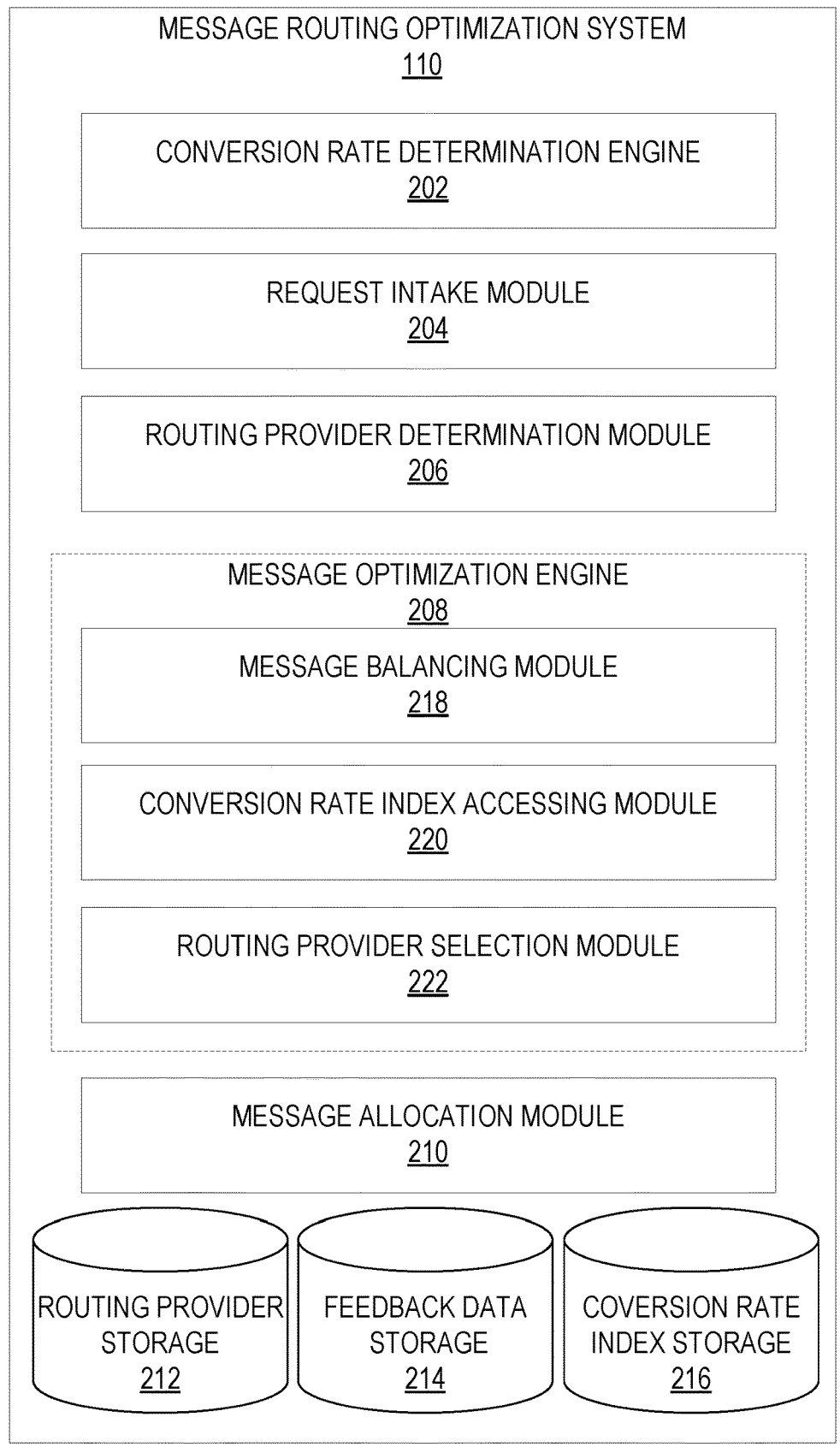
FIG. 2 is a block diagram of a message routing optimization system, according to some example embodiments.

FIG. 2 is a block diagram of a message routing optimization system 110, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the message routing optimization system 110 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the message routing optimization system 110 includes a conversion rate determination engine 202, a request intake module 204, a routing provider determination module 206, a message optimization engine 208, a message allocation module 210, a routing provider storage 212, a feedback data storage 214, and a conversion rate index storage 216. Further, the message optimization engine 208 includes a message balancing module 218, a conversion rate index accessing module 220, and a routing provider selection module 222.

The conversion rate determination engine 202 generates and updates the conversion rate index indicating performance of the routing providers 108. The conversion rate index includes individual conversion rates determined for each routing provider 108. Each conversion rate indicates a performance level of a routing provider 108, such as by indicating an estimated likelihood that a message allocated to the routing provider 108 will be successfully delivered to its intended recipient.

The conversion rate determination engine 202 calculates a conversion rate for each of the routing providers 108 based on feedback data for the routing provider 108. The feedback data may include both live feedback data and testing feedback data. Live feedback describes each routing provider's 108 performance delivering messages that have been allocated to the routing provider 108 by the message routing optimization system 110. For example, the live feedback data can include data describing whether the routing provider 108 transmitted the allocated message to its intended recipient, whether the message was successfully received by its intended recipient, whether the message resulted in a specified action by the recipient, an amount of time that elapsed until the message was transmitted by the routing provider, an amount of time that elapsed until the message was received by the recipient, and the like.

The testing feedback data describes the tested performance of the routing providers 108. For example, tests of a routing provider's network can be conducted during which test messages and/or synthetic messages are transmitted using routes provided by the routing provider 108. The testing feedback data describes the tracked performance of the test messages, such as whether the test messages were transmitted, received and/or resulted in a specified response, as well as the elapsed time for the test messages to be transmitted and/or received.

The conversion rate determination engine 202 gathers the feedback data from the feedback data storage 214. In some embodiments, the conversion rate determination engine 202 may use all of the available feedback data or a subset of the feedback data to calculate the conversion rate for a routing provider 108. For example, the conversion rate determination engine 202 may utilize a sliding window of the available feedback data. The sliding window may define a moving time frame, such as a previous 72 hours, previous 36 hours, and the like. The conversion rate determination engine 202 gather the subset of the feedback data that falls within the sliding window, which is used to calculate the conversion rates for the routing providers 108. Using a sliding window based on time ensures that the conversion rates calculated for the routing providers 108 is based on recent, rather than outdated, data and therefore represents each routing provider's 108 current performance.

As another example, the sliding window may define a number of most recent messages, such as the previous 5,000 messages that were sent using a particular routing provider. In this type of embodiment, the time frame represented by the feedback data for each routing provider may vary based on the volume of messages transmitted by the respective routing providers. This type of sliding window provides balance in the amount of routing data used to calculate the conversion rates for the respective routing providers, while also limiting use of outdated feedback data.

The conversion rate determination engine 202 uses the gathered feedback data to calculate the conversion rate for each routing provider 108. The conversion rate determination engine 202 may use any of a variety of algorithms to calculate the conversion rates. For example, the conversion rate for a routing provider 108 may be based on a percentage of the messages transmitted by routing provider 108 that were successfully delivered. In this type of embodiment, the conversion rate determination engine 202 may use the feedback data for each routing provider 108 to determine a total number of messages allocated to the routing provider 108 and a total number of messages successfully delivered by the routing provider 108, and use the determined values to calculate the percentage of the allocated messages that were successfully delivered by the routing provider 108.

In some embodiments, the conversion rates determined for each routing provider 108 may be an upper confidence bound estimate. An upper confidence bound estimate provides an optimistic estimate (e.g., most optimistic conversion rate) of the performance of each routing provider 108 based on the amount feedback data available. As the upper confidence bound estimate is based on available feedback data, the upper confidence bound estimate for routing providers 108 with limited feedback data will be amplified due to the limited amount feedback data available. For example, the upper confidence bound estimate for a routing provider 108 with limited feedback may initially start very high, however will normalize as additional feedback data is gathered.

Using the upper confidence bound estimate encourages exploration by the message routing optimization system 110, as messages will be allocated to routing providers 108 with limited feedback data, resulting in better estimates in the performance of each routing provider 108 over time.

The conversion rate determination engine 202 may calculate conversion rates for each routing provider 108 as well as for the individual routes provided by the routing providers 108. For example, the conversion rate determination engine 202 may use a subset of the feedback data pertaining to each provided route to calculate a conversion rate for the route. Calculating conversion rates for the routes provides a greater level of granularity when allocating the messages to optimize performance. For example, the message routing optimization system 110 may allocate messages based on performance of the specified route that is to be used by the routing provider 108 rather than the overall performance of the routing provider 108.

The conversion rate index is stored in the conversion rate index storage 216. Accordingly, the conversion rate determination engine 202 communicates with the conversion rate index storage 216 to update the conversion rate index based on the conversion rates calculated for the routing providers 108. In some embodiments, the conversion rate determination engine 202 may update the conversion rate index at regular time intervals, such as every 5 minutes, 10 minutes, and the like. Updating the conversion rate index includes gathering the feedback data, calculating conversion rates for the routing providers 108, and communicating with the conversion rate index storage 216 to updates the conversion rates in the conversion rate index. As a result, the conversion rate index will be continually updated to provide an accurate representation of the performance of the routing providers 108.

The functionality of the conversion rate determination engine 202 is discussed in greater detail below in relation to FIG. 3.

The request intake module 204 receives requests to deliver a message for a customer. For example, the request intake module 204 may receive the request from a customer computing system 106. The request may be transmitted as a result of a user utilizing the online functionality provided by the customer computing system 106. For example, a user may use a client device 102 to communicate with and utilize the functionality of the customer computing system 106, which may involve transmission of the message. For example, a user may request to login to an account, resulting in transmission of a message to provide two-factor authentication. As another example, a user may initiate transmitting a message to an agent of the customer or another user. Alternatively, the request may be transmitted by the customer computing system 106 to provide functionality that is not in direct response to a user use of an online service. For example, the request may be transmitted by the customer computing system 106 to provide promotional materials or updates to users.

The request may include data identifying the customer, data identifying the intended recipient, and/or a payload of the message. For example, the request may include a unique identifier assigned to the customer and/or the customer's account with the message routing optimization system 110. The request may also include an identifier for the recipient of the message, such as a phone number associated with a recipient client device 102, an account of the message routing optimization system 110 associated with the recipient, etc. The payload may include any of a variety of types of data, including text, images, rich media format of data and/or any combination of data formats but not limited to the above formats to be included in the message provided to the recipient.

The routing provider determination module 206 determines a set of routing providers 108 and/or routes that are available to route a message to its intended recipient. Different routing providers 108 may provide message delivery services to a limited set of destination networks, such as destination networks within specified geographic regions. Accordingly, the routing provider determination module 206 uses data associated with a received request to identify the set of routing providers 108 and/or routes that are available to route the requested message to the destination network of the recipient.

The routing provider determination module 206 uses a phone number or other identifier associated with the intended recipient of the message to identify the destination network of the intended recipient. Each destination network may be assigned a Mobile Country Code (MCC)/Mobile Network Code (MNC) pair that identifies the specific destination network.

The routing provider determination module 206 uses the phone number associated with the intended recipient of the message to lookup the MCC/MNC pair identifying the destination network. For example, the routing provider determination module 206 determines the MCC/MNC pair using an MCC/MNC directory that lists the MCC/MNC pair corresponding to each phone number. In some embodiments, the MCC/MNC directory may be stored in the routing provider storage 212. Alternatively, the MCC/MNC directory may be stored at some other network accessible location. In either case, the routing provider determination module 206 uses the phone number associated with the intended recipient of the message to query the MCC/MNC directory and identify the MCC/MNC pair that identifying the corresponding destination network.

The routing provider determination module 206 uses the MCC/MNC pair retrieved from the MCC/MNC directory to identify the routing providers 108 and routes that are available to deliver a message to the destination network identified by MCC/MNC pair. For example, the routing provider storage 212 may include a routing provider directory that lists each MCC/MNC pair serviced by the message routing optimization system 110 and the corresponding routing providers 108 and routes available for use with each MCC/MNC pair. That is, the routing provider directory lists the routing providers and routes that are available to the message routing optimization system 110 to the deliver message to the destination network identified by each MCC/MNC pair listed in the routing provider directory. Accordingly, the routing provider determination module 206 uses the MCC/MNC pair to search the routing provider directory and identify the set of routing provider s108 and routes available to deliver the requested message. The routing provider determination module 206 provides this data to the message optimization engine 208.

The message optimization engine 208 selects a routing provider to deliver each message to optimize overall message routing performance. As shown, the message optimization engine 208 includes a message balancing module 218, a conversion rate index accessing module 220 and a routing provider selection module 222.

The message balancing module 218 determines whether a message is to be allocated for exploitation or exploration purposes. As explained earlier, allocation of messages is balanced between exploration and exploitation purposes to provide optimized message routing performance. For example, the number of messages allocated to the optimal routing provider 108 is maximized, while also allowing for enough messages to be allocated to the secondary routing providers 108 to allow for proper performance assessment of the routing providers 108.

The message balancing module 218 manages this balance between exploitation and exploration by allocation some of the messages to the optimal routing provider 108 to exploit the higher performance provided by the optimal routing provider 108, and allocating another portion of the messages to the secondary routing providers 108 to explore the performance provided by the secondary routing providers 108. For example, the message balancing module 218 may allocate a certain percentage of the messages to each of the secondary routing providers 108 for exploration purposes, with the remaining messages being allocated to the optimal routing provider 108. For example, the message balancing module 218 may allocate 3% of the messages to each secondary routing provider 108 for exploration purposes. Accordingly, in a case in which there are 5 total routing providers 108, 3% of the messages are allocated to each of the 4 secondary routing providers 108 (e.g., 12% total), while the remaining 88% of the messages are allocated to the optimal routing provider 108.

The message balancing module 218 selects whether a message is to be transmitted by the optimal routing provider 108 or the secondary routing providers 108 to meet the predefined allocation percentages. That is, the message balancing module 218 uses predefined allocation percentages to select whether a message request should be allocated the optimal routing provider 108 or the secondary routing providers 108. For example, given the above case, the message balancing module 218 allocates 12% of the messages to the secondary routing providers and the remaining 88% of the messages to the optimal routing provider 108.

The message balancing module 218 may allocate the messages according to the predefined allocation percentages in any of a variety of ways. For example, the message balancing module 218 may fulfill the predefined allocation percentages for each of the optimal routing provider 108 and secondary routing providers 108 in set chunks, such as by selecting 88 messages in a row to be allocated to the optimal routing provider 108 followed by 12 messages allocated to the secondary messages providers 108, and so forth. Alternatively, the message balancing module 218 may evenly intersperse the messages allocated to the secondary routing providers 108 throughout the messages allocated to the optimal routing provider 108, such as by allocated 1 out of every 8 or 9 messages to the secondary routing providers 108.

The message balancing module 218 provides an instruction to the routing provider selection module 222 indicating whether a message is to be allocated to the optimal routing provider 108 or one of the secondary routing providers 108.

The routing provider selection module 222 selects the specific routing provider 108 to which each message is to be allocated. For example, the routing provider selection module 222 determines the optimal routing provider 108 and the secondary routing providers 108 and selects a routing provider 108 based on the instruction received from the message balancing module 218. For example, in the case that the instruction indicates that the message is to be allocated to a secondary routing provider 108, the routing provider selection module 222 selects the specific secondary routing provider 108. In the case that the instruction indicates that the message is to be allocated to the optimal routing provider 108, the routing provider selection module 222 selects the routing provider 108 that has the best current performance.

The routing provider selection module 222 determines the optimal routing provider 108 and the secondary routing providers 108 based on the conversion rates for each routing provider 108. The conversion rate index accessing module 220 provides the conversion rate index to the routing provider selection module 222. For example, the conversion rate index accessing module 220 accesses the conversion rate index from the conversion rate index storage 216 and provides the conversion rate index to the routing provider selection module 222. The conversion rate index accessing module 220 may perform this functionality at specified time intervals. For example, the conversion rate index accessing module 220 may access the conversion rate index at specified time intervals based on when the conversion rate index is updated by the conversion rate determination engine 202. Alternatively, the conversion rate index accessing module 220 may access the conversion rate index for each request received by the message optimization engine 208.

The routing provider selection module 222 uses the conversion rate index to identify the optimal routing provider 108. For example, the routing provider selection module 222 may rank the routing providers 108 based on the conversion rates included in the conversion rate index. The routing provider 108 ranked the highest (e.g., the routing provider 108 with the highest conversion rate) is determined to be the optimal routing provider 108, while the other routing providers 108 are determined to be the secondary routing providers 108. In some cases, multiple routing providers 108 may have the highest conversion rate. In this type of situation, the routing provider selection module 222 may identify each of the routing providers 108 with the highest conversion rate as being the optimal routing provider 108.

The routing provider selection module 222 selects the specific secondary routing provider 108 or, in cases in which there are multiple optimal routing providers 108, the specific optimal routing provider 108 for each message. For example, the routing provider selection module 222 may select from the secondary providers 108 or optimal routing providers 108 in any of a variety of manners, such as using a round robin order, random order, or the like.

The routing provider selection module 222 instructs the message allocation module 210 to allocate the message to the selected routing provider 108. In turn, the message allocation module 210 communicates with the selected routing provider 108 to allocate the message for delivery. For example, the message allocation module 210 may provide the routing provider with the message (e.g., message payload), data identifying the intended recipient (e.g., phone number) and/or a specific route selected for use.

The message allocation module 210 may also generate a record for each message allocated to a routing provider 108. For example, the message allocation module 210 may generate a record in the feedback data storage 214 for each allocated message. The record may include data identifying the message, intended recipient, the routing provider 108 to which the message was allocated, a time at which the message was allocated, a route selected to transmit the message, and the like. The recorded data is used as feedback data for assessing performance of the routing providers 108.

Figure 3:
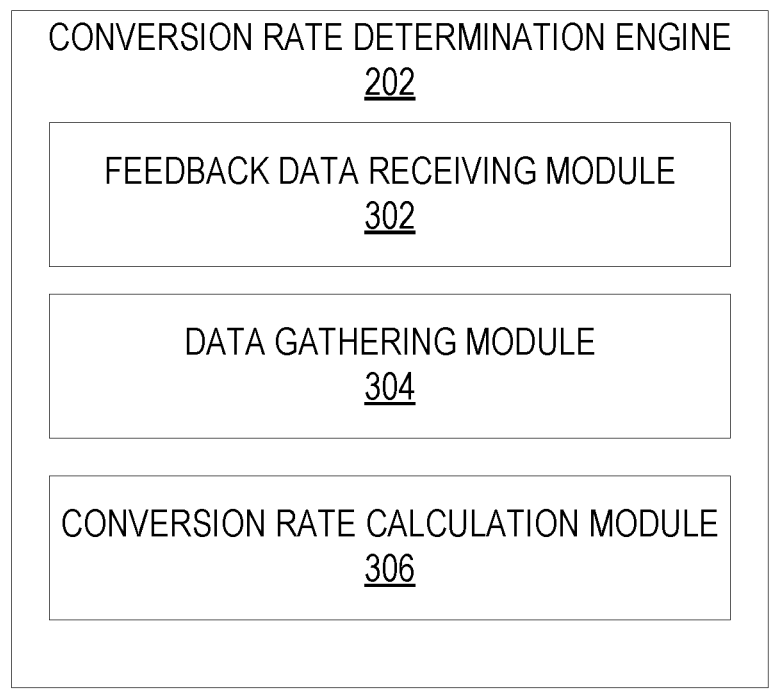
FIG. 3 is a block diagram of a conversion rate determination engine, according to some example embodiments.

FIG. 3 is a block diagram of a conversion rate determination engine 202, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the conversion rate determination engine 202 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the conversion rate determination engine 202 includes a feedback data receiving module 302, a data gathering module 304, and a conversion rate calculation module 306.

The feedback data receiving module 302 receives feedback data used to calculate the conversion rates for the routing providers 108. The feedback data may include both live feedback data and testing feedback data. Live feedback describes each routing provider's 108 performance delivering messages that have been allocated to the routing provider 108 by the message routing optimization system 110. For example, the live feedback data can include data describing whether the routing provider 108 transmitted the allocated message to its intended recipient, whether the message was successfully received by its intended recipient, whether the message resulted in a specified action by the recipient, an amount of time that elapsed until the message was transmitted by the routing provider, an amount of time that elapsed until the message was received by the recipient, and the like.

The testing feedback data describes the tested performance of the routing providers 108. For example, tests of a routing provider's network can be conducted during which test messages and/or synthetic messages are transmitted using routes provided by the routing provider 108. The testing feedback data describes the tracked performance of the test messages, such as whether the test messages were transmitted, received and/or resulted in a specified response, as well as the elapsed time for the test messages to be transmitted and/or received.

The feedback data receiving module 302 may receive the live feedback data from customer computing systems 106, routing providers 108, and or directly from recipient client devices 102. For example, a customer computing system 106 may elicit acknowledgements from the client devices 102, 104 to which the customer has sent messages. The acknowledgements indicate that a message transmitted to the client device 102 was received. The customer computing systems 106 may provide this live feedback data to the message routing optimization system 110, which is received by the feedback data receiving module 302. A routing provider 108 may similarly elicit live feedback data in relation to the messages transmitted by the routing provider 108, which the routing provider may provide to data to the message routing optimization system 110.

The feedback data receiving module 302 may also receive live feedback data directly from the recipient client devices 102, 104 to which the messages are directed. For example, the client devices 102, 104 may transmit acknowledgement messages directly to the message routing optimization system 110 indicating that the client device 102 received a message. The client devices 102, 104 may transmit the acknowledgement using an Application Programming Interface (API) command provided by the message routing optimization system 110. This type of feedback API allows the live feedback data to be transmitted directly to the message routing optimization system 110 from the client devices 102, 104, rather than through an intermediary system, such as a routing provider 108 and/or a customer computing system 106.

The feedback data receiving module 302 updates the feedback data storage 214 based on the received live feedback data. For example, the feedback data receiving module 302 may update the records in the feedback data storage 214 that were generated by the message allocation module 210. The message allocation module 210 generates a record in the feedback data storage 214 recording each message allocated by the message allocation module 210 to a routing provider 108 for delivery. The feedback data receiving module 302 updates the records based on the received live feedback data to indicate whether the transmitted message was successfully received by its intended recipient.

The feedback data receiving module 302 may receive testing feedback data from testing systems (not shown). The testing system run tests of the routing providers 108 networks during which test and/or synthetic messages are transmitted using various routes provided by the routing providers 108. The testing system tracks performance of the test messages, such as whether the test messages were transmitted, received and/or resulted in a specified response, the elapsed time for the test messages to be transmitted and/or received, etc. The testing system generates testing feedback data based on the tracked performance of the tests and provides the generated testing feedback data to the message routing optimization system 110. The feedback data receiving module 302 stores the testing feedback data in the feedback data storage 214.

The data gathering module 304 gathers feedback data used to calculate the conversion rates for the routing providers 108. The data gathering module 304 gathers the feedback data from the feedback data storage 214. The data gathering module 304 may gather all of the available feedback data or a subset of the feedback data based on the given implementation. For example, in some implementations, a sliding window of the available feedback data may be used rather than all of the available feedback data. The sliding window defines a moving time frame, such as a previous 72 hours, previous 36 hours, and the like. In this type of embodiment, the data gathering module 304 gather the subset of the available feedback data that falls within the sliding window. Using a sliding window ensures that the conversion rates calculated for the routing providers 108 are based on recent, rather than outdated, feedback data.

The conversion rate calculation module 306 uses the feedback data gathered by the data gathering module 304 to calculate conversion rates for the routing providers 108. The conversion rate calculation module 306 may use any of a variety of algorithms to calculate the conversion rates. For example, the conversion rate for a routing provider 108 may be based on a percentage of the messages transmitted by routing provider 108 that were successfully delivered. In this type of embodiment, the conversion rate calculation module 306 may use the feedback data for each routing provider 108 to determine a total number of messages allocated to the routing provider 108 and a total number of messages successfully delivered by the routing provider 108, and use the determined values to calculate the percentage of the allocated messages that were successfully delivered by the routing provider 108.

In some embodiments, the conversion rates determined for each routing provider 108 may be an upper confidence bound estimate. An upper confidence bound estimate provides an optimistic estimate (e.g., most optimistic conversion rate) of the performance of each routing provider 108 based on the amount feedback data available. As the upper confidence bound estimate is based on available feedback data, the upper confidence bound estimate for routing providers 108 with limited feedback data will be amplified due to the limited amount feedback data available. For example, the upper confidence bound estimate for a routing provider 108 with limited feedback may initially start very high, however will normalize as additional feedback data is gathered.

Using the upper confidence bound estimate encourages exploration by the message routing optimization system 110, as messages will be allocated to routing providers 108 with limited feedback data, resulting in better estimates in the performance of each routing provider 108 over time.

The conversion rate calculation module 306 may calculate conversion rates for each routing provider 108 as well as for the individual routes provided by the routing providers 108. For example, the conversion rate calculation module 306 may use a subset of the feedback data pertaining to each provided route to calculate a conversion rate for the route. Calculating conversion rates for the routes provides a greater level of granularity when allocating the messages to optimize performance.

The conversion rate calculation module 306 updates the conversion rate index based on the updated conversion rates. The conversion rate index is stored in the conversion rate index storage 216. Accordingly, the conversion rate calculation module 306 communicates with the conversion rate index storage 216 to update the conversion rate index based on the conversion rates calculated for the routing providers 108.

Figure 4:
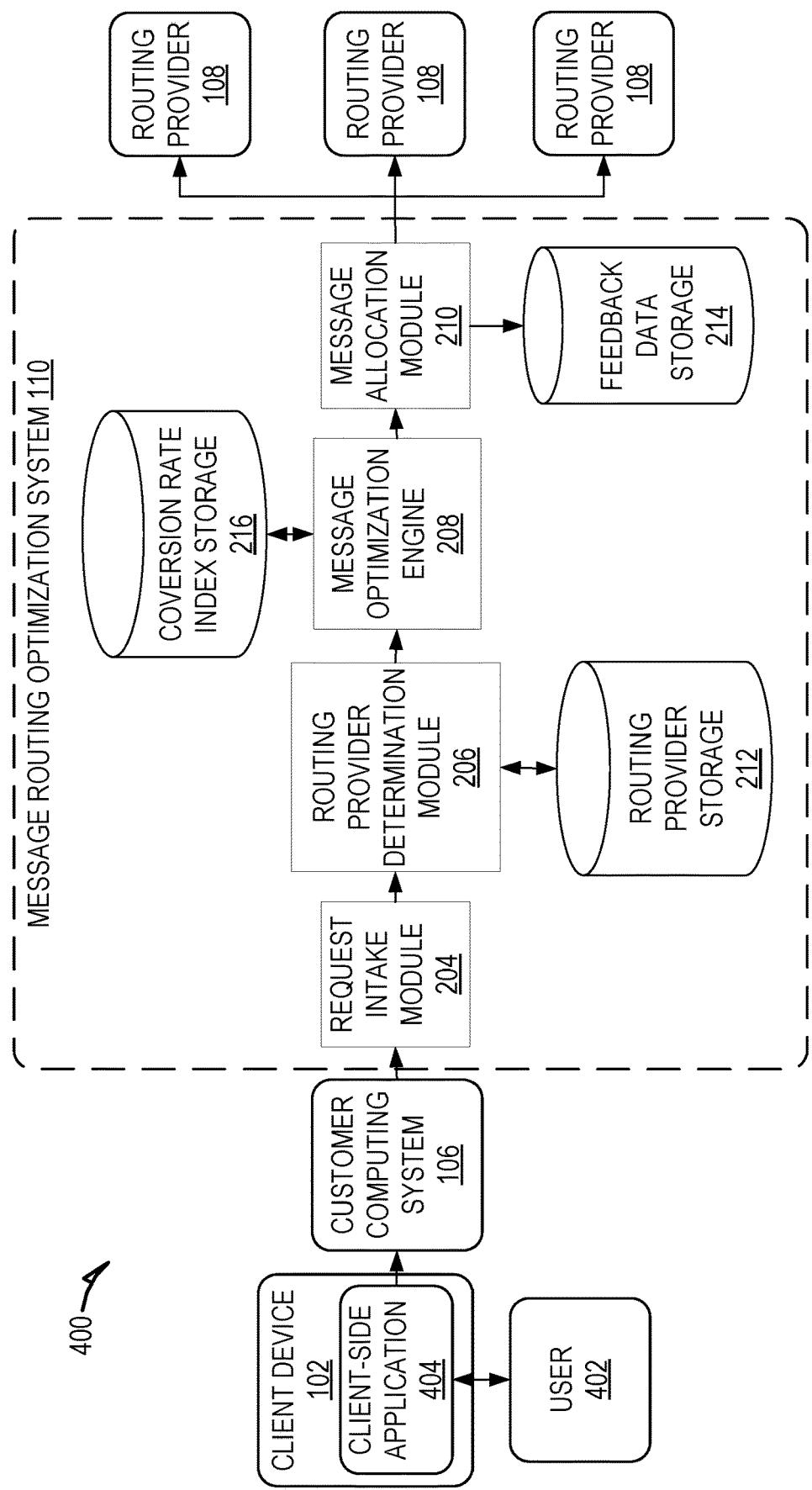
FIG. 4 shows communications within a system for message routing optimization, according to some example embodiments.

FIG. 4 shows communications within a system 400 for message routing optimization, according to some example embodiments. To avoid obscuring the inventive subject matter with unnecessary detail, various functional components (e.g., modules, devices, databases, etc.) that are not germane to conveying an understanding of the inventive subject matter have been omitted from FIG. 4. However, a skilled artisan will readily recognize that various additional functional components may be supported by the system 400 to facilitate additional functionality that is not specifically described herein. Furthermore, the various functional components depicted in FIG. 4 may reside on a single computing device or may be distributed across several computing devices in various arrangements such as those used in cloud-based architectures.

As shown, a user 402 uses a client-side application 404 installed on a client device 102 to utilize the functionality of a customer computing system 106. The customer may provide any type of service, such as a banking service, travel service, retail service, and the like. The service may be an online and/or offline service. That is, the service may be available only online, such as an online retailer, offline, such as a physical retailer, or both online and offline, such as a retailer that provides a website or application as well as a physical retail store.

The customer computing system 106 may transmit messages as part of its provided services. For example, the customer computing system 106 may allow the user 402 to transmit messages to an agent of the customer, transmit messages to other users 402, request a message be transmitted to the client device 102 to provide information, password reset, etc. The customer computing system 106 may also transmit messages that are not in response to a request made by a user 402. For example, the customer computing system 106 may transmit messages to provide a user 402 with a notification, marketing materials, etc.

The customer may use the functionality of the message routing optimization system 110 to provide to optimized message routing performance. The message routing optimization system 110 provides optimized message routing performance by allocating messages to routing providers 108 based on a determined performance of the routing provider 108. For example, the message routing optimization system 110 allocates messages to the routing providers 108 based on a conversion rate index that includes individual conversion rates determined for each routing provider 108. Each conversion rate indicates a performance level of a routing provider 108, such as by indicating an estimated likelihood that a message allocated to the routing provider will be successfully delivered to its intended recipient. The message routing optimization system 110 allocates messages to the routing providers 108 based on the conversion rate index, such as by allocating messages to the routing provider 108 with the highest conversion rate.

To utilize the functionality of the message routing optimization system 110, the customer computing system 106 transmits a request to the message routing optimization system 110. The request requests that the message routing optimization system 110 transmit a message to an intended recipient and may include data identifying the recipient of the message. For example, the request may include a phone number or other contact identifier associated with the recipient.

The request is received by the request intake module 204 of the message routing optimization system 110. The request intake module 204 provides the received request to the routing provider determination module 206. The routing provider determination module 206 determines a set of routing providers 108 and/or routes that are available to route a message to its intended recipient.

The routing provider determination module 206 uses a phone number or other contact identifier associated with the intended recipient of the message to identify the destination network of the intended recipient. For example, the routing provider determination module 206 uses the phone number associated with the intended recipient of the message to search an MCC/MNC directory for the MCC/MCN pair identifying the destination network corresponding to the intended recipient. In some embodiments, the MCC/MNC directory may be stored in the routing provider storage 212. Alternatively, the MCC/MNC directory may be stored at some other network accessible location. In either case, the routing provider determination module 206 uses the phone number associated with the intended recipient of the message to query the MCC/MNC directory and identify the MCC/MNC pair that identifying the corresponding destination network.

The routing provider determination module 206 uses the MCC/MNC pair retrieved from the MCC/MNC directory to identify the routing providers 108 and routes that are available to deliver a message to the destination network identified by MCC/MNC pair. For example, the routing provider storage 212 may include a routing provider directory that lists each MCC/MNC pair serviced by the message routing optimization system 110 and the corresponding routing providers 108 and routes available for use with each MCC/MNC pair. That is, the routing provider directory lists the routing providers and routes that are available to the message routing optimization system 110 to the deliver message to the destination network identified by each MCC/MNC pair listed in the routing provider directory. Accordingly, the routing provider determination module 206 uses the MCC/MNC pair to search the routing provider directory and identify the set of routing providers 108 and routes available to deliver the requested message. The routing provider determination module 206 provides this data to the message optimization engine 208.

The message optimization engine 208 provides optimized message routing performance by allocating messages to routing providers 108 based on a determined performance of the routing provider 108. For example, the message optimization engine 208 selects a routing provider based 108 based on a conversion rate index indicating the performance of each routing provider, such as by allocating messages to the routing provider 108 with the highest conversion rate. The conversion rate index may access the conversion rate index from the conversion rate index storage 216.

The message optimization engine 208 balances allocation of messages for exploration and exploitation purposes to provide optimized message routing performance. For example, the message optimization engine 208 attempts to maximize the number of messages allocated to the optimal routing provider 108, while also allocating enough messages to the secondary routing providers 108 to allow for proper performance assessment of the routing providers 108.

Accordingly, the message optimization engine 208 selects whether a message is to be allocated to the optimal routing provider 108 or a secondary routing provider 108. The message optimization engine 208 also determines the specific routing provider 108 based on the previous selection. For example, in the case that the message is to be allocated to a secondary routing provider 108, the message optimization engine 208 selects the specific secondary routing provider 108. Alternatively, in the case that the message is to be allocated to the optimal routing provider 108, the message optimization engine 208 selects the routing provider 108 that has the best current performance.

The message optimization engine 208 instructs the message allocation module 210 to allocate the message to the selected routing provider 108. The functionality of the message optimization engine 208 is described in greater detail in relation to FIG. 5.

The message allocation module 210 allocates each message to the routing providers 108 selected by the message optimization engine 208. The message allocation module 210 communicates with the selected routing provider 108 to allocate the message for delivery. For example, the message allocation module 210 may provide the routing provider with the message (e.g., message payload), data identifying the intended recipient (e.g., phone number) and/or a specific route selected for use.

The message allocation module 210 may also generate a record for each message allocated to a routing provider 108. For example, the message allocation module 210 may generate a record in the feedback data storage 214 for each allocated message. The record may include data identifying the message, intended recipient, the routing provider 108 to which the message was allocated, a time at which the message was allocated, a route selected to transmit the message, and the like. The recorded data is used as feedback data for assessing performance of the routing providers 108.

Figure 5:
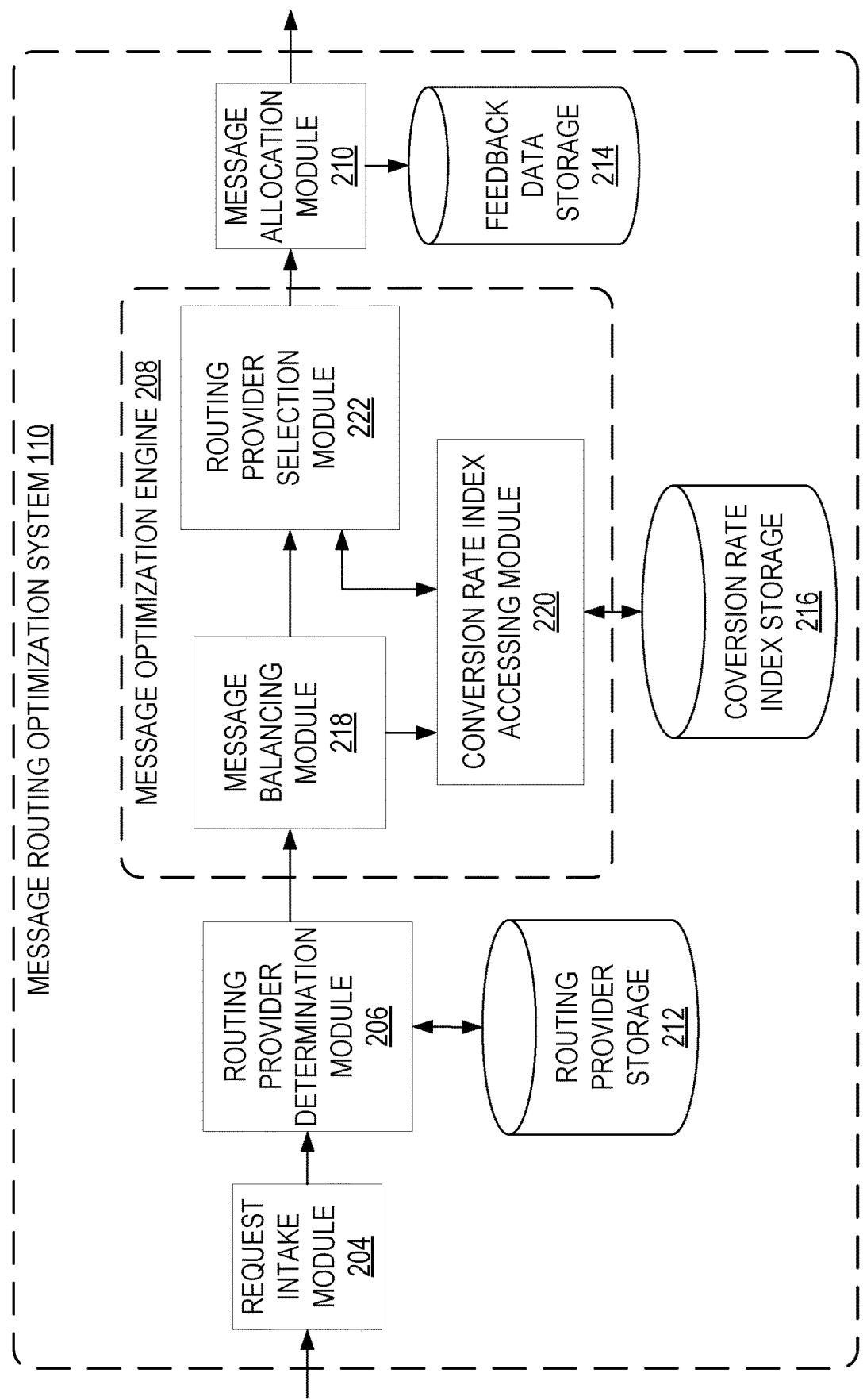
FIG. 5 shows communications within a message routing optimization system for selecting a routing provider to deliver a message based on customer criteria, according to some example embodiments.

FIG. 5 shows communications within a message routing optimization system 110 for selecting a routing provider to deliver a message based on customer criteria, according to some example embodiments. To avoid obscuring the inventive subject matter with unnecessary detail, various functional components (e.g., modules, devices, databases, etc.) that are not germane to conveying an understanding of the inventive subject matter have been omitted from FIG. 5. However, a skilled artisan will readily recognize that various additional functional components may be supported by the system 500 to facilitate additional functionality that is not specifically described herein. Furthermore, the various functional components depicted in FIG. 5 may reside on a single computing device or may be distributed across several computing devices in various arrangements such as those used in cloud-based architectures.

As shown, the request intake module 204 receives a request to deliver a message. For example, the request may be received from a customer computing system 106. The request intake module 204 provides the received request to the routing provider determination module 206.

The request intake module 204 provides the received request to the routing provider determination module 206. The routing provider determination module 206 determines a set of routing providers 108 and/or routes that are available to route a message to its intended recipient.

The routing provider determination module 206 uses a phone number or other contact identifier associated with the intended recipient of the message to identify the destination network of the intended recipient. For example, the routing provider determination module 206 uses the phone number associated with the intended recipient of the message to search an MCC/MNC directory for the MCC/MCN pair identifying the destination network corresponding to the intended recipient. In some embodiments, the MCC/MNC directory may be stored in the routing provider storage 212. Alternatively, the MCC/MNC directory may be stored at some other network accessible location. In either case, the routing provider determination module 206 uses the phone number associated with the intended recipient of the message to query the MCC/MNC directory and identify the MCC/MNC pair that identifying the corresponding destination network.

The routing provider determination module 206 uses the MCC/MNC pair retrieved from the MCC/MNC directory to identify the routing providers 108 and routes that are available to deliver a message to the destination network identified by MCC/MNC pair. For example, the routing provider storage 212 may include a routing provider directory that lists each MCC/MNC pair serviced by the message routing optimization system 110 and the corresponding routing providers 108 and routes available for use with each MCC/MNC pair. That is, the routing provider directory lists the routing providers and routes that are available to the message routing optimization system 110 to the deliver message to the destination network identified by each MCC/MNC pair listed in the routing provider directory. Accordingly, the routing provider determination module 206 uses the MCC/MNC pair to search the routing provider directory and identify the set of routing providers 108 and routes available to deliver the requested message. The routing provider determination module 206 provides this data to the message optimization engine 208.

The message optimization engine 208 selects a routing provider to deliver each message to optimize overall message routing performance. As shown, the message optimization engine 208 includes a message balancing module 218, a conversion rate index accessing module 220 and a routing provider selection module 222.

The message is initially received by the message balancing module 218. The message balancing module 218 determines whether a message is to be allocated for exploitation or exploration purposes. As explained earlier, allocation of messages is balanced between exploration and exploitation purposes to provide optimized message routing performance. For example, the number of messages allocated to the optimal routing provider 108 is maximized, while also allowing for enough messages to be allocated to the secondary routing providers 108 to allow for proper performance assessment of the routing providers 108.

The message balancing module 218 manages this balance between exploitation and exploration by allocation some of the messages to the optimal routing provider 108 to exploit the higher performance provided by the optimal routing provider 108, and allocating another portion of the messages to the secondary routing providers 108 to explore the performance provided by the secondary routing providers 108. For example, the message balancing module 218 may allocate a certain percentage of the messages to each of the secondary routing providers 108 for exploration purposes, with the remaining messages being allocated to the optimal routing provider 108. For example, the message balancing module 218 may allocate 3% of the messages to each secondary routing provider 108 for exploration purposes. Accordingly, in a case in which there are 5 total routing providers 108, 3% of the messages are allocated to each of the 4 secondary routing providers 108 (e.g., 12% total), while the remaining 88% of the messages are allocated to the optimal routing provider 108.

The message balancing module 218 selects whether a message is to be transmitted by the optimal routing provider 108 or the secondary routing providers 108 to meet the predefined allocation percentages. That is, the message balancing module 218 uses predefined allocation percentages to select whether a message request should be allocated the optimal routing provider 108 or the secondary routing providers 108. For example, given the above case, the message balancing module 218 allocates 12% of the messages to the secondary routing providers and the remaining 88% of the messages to the optimal routing provider 108.

The message balancing module 218 may allocate the messages according to the predefined allocation percentages in any of a variety of ways. For example, the message balancing module 218 may fulfill the predefined allocation percentages for each of the optimal routing provider 108 and secondary routing providers 108 in set chunks, such as by selecting 88 messages in a row to be allocated to the optimal routing provider 108 followed by 12 messages allocated to the secondary messages providers 108, and so forth. Alternatively, the message balancing module 218 may evenly intersperse the messages allocated to the secondary routing providers 108 throughout the messages allocated to the optimal routing provider 108, such as by allocated 1 out of every 8 or 9 messages to the secondary routing providers 108.

The message balancing module 218 provides an instruction to the routing provider selection module 222 indicating whether a message is to be allocated to the optimal routing provider 108 or one of the secondary routing providers 108.

The routing provider selection module 222 selects the specific routing provider 108 to which each message is to be allocated. For example, the routing provider selection module 222 determines the optimal routing provider 108 and the secondary routing providers 108 and selects a routing provider 108 based on the instruction received from the message balancing module 218. For example, in the case that the instruction indicates that the message is to be allocated to a secondary routing provider 108, the routing provider selection module 222 selects the specific secondary routing provider 108. In the case that the instruction indicates that the message is to be allocated to the optimal routing provider 108, the routing provider selection module 222 selects the routing provider 108 that has the best current performance.

The routing provider selection module 222 determines the optimal routing provider 108 and the secondary routing providers 108 based on the conversion rates for each routing provider 108. The conversion rate index accessing module 220 provides the conversion rate index to the routing provider selection module 222. For example, the conversion rate index accessing module 220 accesses the conversion rate index from the conversion rate index storage 216 and provides the conversion rate index to the routing provider selection module 222.

The conversion rate index accessing module 220 may perform this functionality at specified time intervals. For example, the conversion rate index accessing module 220 may access the conversion rate index at specified time intervals based on when the conversion rate index is updated by the conversion rate determination engine 202. Alternatively, the conversion rate index accessing module 220 may access the conversion rate index for each request received by the message optimization engine 208. For example, the message balancing module 218 may instruct the conversion rate index accessing module 220 to provide the conversion rate index to the routing provider selection module 222. As another example, the routing provider selection module 222 may communicate with the conversion rate index accessing module 220 to request the conversion rate index.

The routing provider selection module 222 uses the conversion rate index to identify the optimal routing provider 108. For example, the routing provider selection module 222 may rank the routing providers 108 based on the conversion rates included in the conversion rate index. The routing provider 108 ranked the highest (e.g., the routing provider 108 with the highest conversion rate) is determined to be the optimal routing provider 108, while the other routing providers 108 are determined to be the secondary routing providers 108. In some cases, multiple routing providers 108 may have the highest conversion rate. In this type of situation, the routing provider selection module 222 may identify each of the routing providers 108 with the highest conversion rate as being the optimal routing provider 108.

The routing provider selection module 222 selects the specific secondary routing provider 108 or, in cases in which there are multiple optimal routing providers 108, the specific optimal routing provider 108 for each message. For example, the routing provider selection module 222 may select from the secondary providers 108 or optimal routing providers 108 in any of a variety of manners, such as using a round robin order, random order, or the like.

The routing provider selection module 222 instructs the message allocation module 210 to allocate the message to the selected routing provider 108. In turn, the message allocation module 210 communicates with the selected routing provider 108 to allocate the message for delivery. For example, the message allocation module 210 may provide the routing provider with the message (e.g., message payload), data identifying the intended recipient (e.g., phone number) and/or a specific route selected for use.

The message allocation module 210 may also generate a record for each message allocated to a routing provider 108. For example, the message allocation module 210 may generate a record in the feedback data storage 214 for each allocated message. The record may include data identifying the message, intended recipient, the routing provider 108 to which the message was allocated, a time at which the message was allocated, a route selected to transmit the message, and the like. The recorded data is used as feedback data for assessing performance of the routing providers 108.

Figure 6:
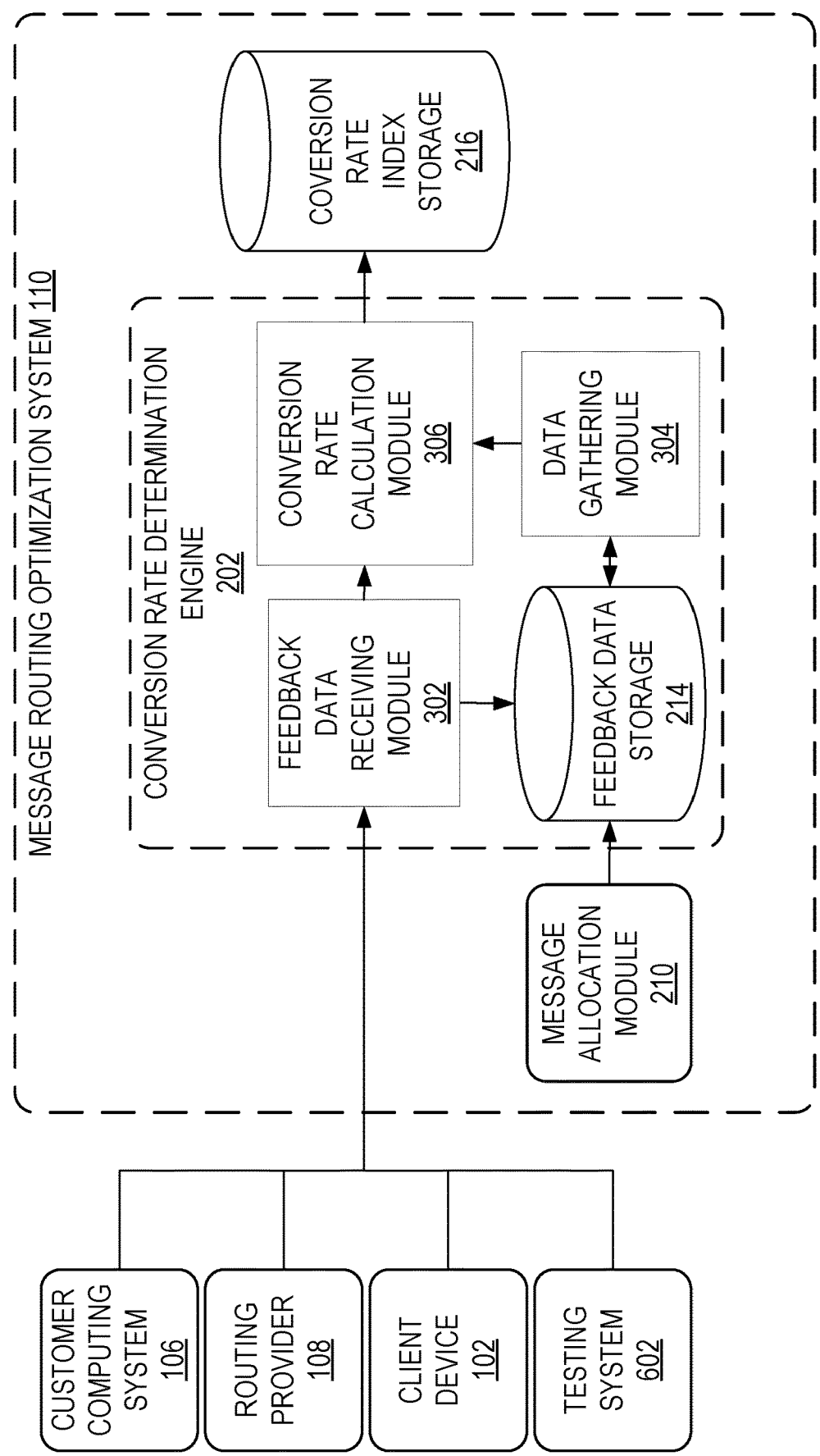
FIG. 6 shows communications within a message routing optimization system for generating the conversion rate index, according to some example embodiments.

FIG. 6 shows communications within a message routing optimization system 110 for generating the conversion rate index, according to some example embodiments. As shown, the conversion rate determination engine 202 includes a feedback data receiving module 302, a data gathering module 304, and a conversion rate calculation module 306.

The feedback data receiving module 302 receives feedback data used to calculate the conversion rates for the routing providers 108. The feedback data may include both live feedback data and testing feedback data. Live feedback describes each routing provider's 108 performance delivering messages that have been allocated to the routing provider 108 by the message routing optimization system 110. For example, the live feedback data can include data describing whether the routing provider 108 transmitted the allocated message to its intended recipient, whether the message was successfully received by its intended recipient, whether the message resulted in a specified action by the recipient, an amount of time that elapsed until the message was transmitted by the routing provider, an amount of time that elapsed until the message was received by the recipient, and the like.

The testing feedback data describes the tested performance of the routing providers 108. For example, tests of a routing provider's network can be conducted during which test messages and/or synthetic messages are transmitted using routes provided by the routing provider 108. The testing feedback data describes the tracked performance of the test messages, such as whether the test messages were transmitted, received and/or resulted in a specified response, as well as the elapsed time for the test messages to be transmitted and/or received.

The feedback data receiving module 302 may receive the live feedback data from customer computing systems 106, routing providers 108, and or directly from recipient client devices 102. For example, a customer computing system 106 may elicit acknowledgements from the client devices 102, 104 to which the customer has sent messages. The acknowledgements indicate that a message transmitted to the client device 102 was received. The customer computing systems 106 may provide this live feedback data to the message routing optimization system 110, which is received by the feedback data receiving module 302. A routing provider 108 may similarly elicit live feedback data in relation to the messages transmitted by the routing provider 108, which the routing provider may provide to data to the message routing optimization system 110.

The feedback data receiving module 302 may also receive live feedback data directly from the recipient client devices 102, 104 to which the messages are directed. For example, the client devices 102, 104 may transmit acknowledgement messages directly to the message routing optimization system 110 indicating that the client device 102 received a message. The client devices 102, 104 may transmit the acknowledgement using an Application Programming Interface (API) command provided by the message routing optimization system 110. This type of feedback API allows the live feedback data to be transmitted directly to the message routing optimization system 110 from the client devices 102, 104, rather than through an intermediary system, such as a routing provider 108 and/or a customer computing system 106.

The feedback data receiving module 302 updates the feedback data storage 214 based on the received live feedback data. For example, the feedback data receiving module 302 may update the records in the feedback data storage 214 that were generated by the message allocation module 210. The message allocation module 210 generates a record in the feedback data storage 214 recording each message allocated by the message allocation module 210 to a routing provider 108 for delivery. The feedback data receiving module 302 updates the records based on the received live feedback data to indicate whether the transmitted message was successfully received by its intended recipient.

The feedback data receiving module 302 may receive testing feedback data from a testing system 602. The testing system 602 runs tests of the routing providers 108 networks during which test and/or synthetic messages are transmitted using various routes provided by the routing providers 108. The testing system 602 tracks performance of the test messages, such as whether the test messages were transmitted, received and/or resulted in a specified response, the elapsed time for the test messages to be transmitted and/or received, etc. The testing system 602 generates testing feedback data based on the tracked performance of the tests and provides the generated testing feedback data to the message routing optimization system 110. The feedback data receiving module 302 stores the testing feedback data in the feedback data storage 214.

The data gathering module 304 gathers feedback data used to calculate the conversion rates for the routing providers 108. The data gathering module 304 gathers the feedback data from the feedback data storage 214. The data gathering module 304 may gather all of the available feedback data or a subset of the feedback data based on the given implementation. For example, in some implementations, a sliding window of the available feedback data may be used rather than all of the available feedback data. The sliding window defines a moving time frame, such as a previous 72 hours, previous 36 hours, and the like. In this type of embodiment, the data gathering module 304 gather the subset of the available feedback data that falls within the sliding window. Using a sliding window ensures that the conversion rates calculated for the routing providers 108 are based on recent, rather than outdated, feedback data.

The conversion rate calculation module 306 uses the feedback data gathered by the data gathering module 304 to calculate conversion rates for the routing providers 108. The conversion rate calculation module 306 may use any of a variety of algorithms to calculate the conversion rates. For example, the conversion rate for a routing provider 108 may be based on a percentage of the messages transmitted by routing provider 108 that were successfully delivered. In this type of embodiment, the conversion rate calculation module 306 may use the feedback data for each routing provider 108 to determine a total number of messages allocated to the routing provider 108 and a total number of messages successfully delivered by the routing provider 108, and use the determined values to calculate the percentage of the allocated messages that were successfully delivered by the routing provider 108.

In some embodiments, the conversion rates determined for each routing provider 108 may be an upper confidence bound estimate. An upper confidence bound estimate provides an optimistic estimate (e.g., most optimistic conversion rate) of the performance of each routing provider 108 based on the amount feedback data available. As the upper confidence bound estimate is based on available feedback data, the upper confidence bound estimate for routing providers 108 with limited feedback data will be amplified due to the limited amount feedback data available. For example, the upper confidence bound estimate for a routing provider 108 with limited feedback may initially start very high, however will normalize as additional feedback data is gathered.

Using the upper confidence bound estimate encourages exploration by the message routing optimization system 110, as messages will be allocated to routing providers 108 with limited feedback data, resulting in better estimates in the performance of each routing provider 108 over time.

The conversion rate calculation module 306 may calculate conversion rates for each routing provider 108 as well as for the individual routes provided by the routing providers 108. For example, the conversion rate calculation module 306 may use a subset of the feedback data pertaining to each provided route to calculate a conversion rate for the route. Calculating conversion rates for the routes provides a greater level of granularity when allocating the messages to optimize performance.

The conversion rate calculation module 306 updates the conversion rate index based on the updated conversion rates. The conversion rate index is stored in the conversion rate index storage 216. Accordingly, the conversion rate calculation module 306 communicates with the conversion rate index storage 216 to update the conversion rate index based on the conversion rates calculated for the routing providers 108.

Figure 7:
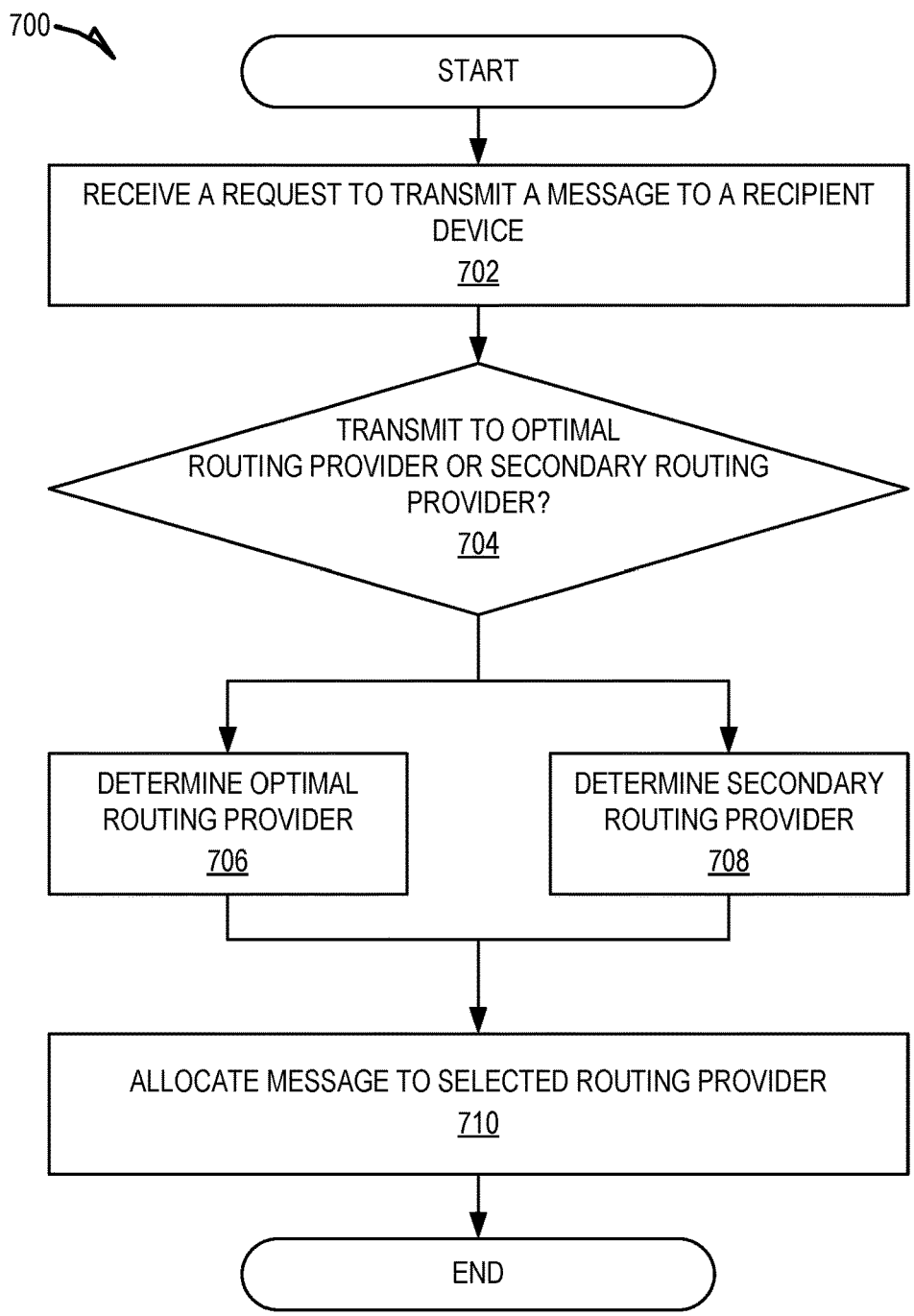
FIG. 7 is a flowchart showing a method for message routing optimization, according to some example embodiments.

FIG. 7 is a flowchart showing a method 700 for message routing optimization, according to some example embodiments. The method 700 may be embodied in computer readable instructions for execution by one or more processors such that the operations of the method 700 may be performed in part or in whole by the message routing optimization system 110; accordingly, the method 700 is described below by way of example with reference thereto. However, it shall be appreciated that at least some of the operations of the method 700 may be deployed on various other hardware configurations and the method 700 is not intended to be limited to the message routing optimization system 110.

At operation 702, the request intake module 204 receives a request to transmit a message to a recipient device. For example, the request intake module 204 may receive the request from a customer computing system 106. The request may be transmitted as a result of a user utilizing the online functionality provided by the customer computing system 106. For example, a user may use a client device 102 to communicate with and utilize the functionality of the customer computing system 106, which may involve transmission of the message. For example, a user may request to login to an account, resulting in transmission of a message to provide two-factor authentication. As another example, a user may initiate transmitting a message to an agent of the customer or another user. Alternatively, the request may be transmitted by the customer computing system 106 to provide functionality that is not in direct response to a user use of an online service. For example, the request may be transmitted by the customer computing system 106 to provide promotional materials or updates to users.

The request may include data identifying the customer, data identifying the intended recipient, and/or a payload of the message. For example, the request may include a unique identifier assigned to the customer and/or the customer's account with the message routing optimization system 110. The request may also include an identifier for the recipient of the message, such as a phone number associated with a recipient client device 102, an account of the message routing optimization system 110 associated with the recipient, etc. The payload may include any of a variety of types of data, including text, images, rich media format of data and/or any combination of data formats but not limited to the above formats to be included in the message provided to the recipient.

At operation 704, the message balancing module 218 determines whether to transmit the message to the optimal routing provider 108 or a secondary routing provider 108. In other words, the message balancing module 218 determines whether a message is to be allocated for exploitation or exploration purposes. As explained earlier, allocation of messages is balanced between exploration and exploitation purposes to provide optimized message routing performance. For example, the number of messages allocated to the optimal routing provider 108 is maximized, while also allowing for enough messages to be allocated to the secondary routing providers 108 to allow for proper performance assessment of the routing providers 108.

The message balancing module 218 manages this balance between exploitation and exploration by allocation some of the messages to the optimal routing provider 108 to exploit the higher performance provided by the optimal routing provider 108, and allocating another portion of the messages to the secondary routing providers 108 to explore the performance provided by the secondary routing providers 108. For example, the message balancing module 218 may allocate a certain percentage of the messages to each of the secondary routing providers 108 for exploration purposes, with the remaining messages being allocated to the optimal routing provider 108. For example, the message balancing module 218 may allocate 3% of the messages to each secondary routing provider 108 for exploration purposes.

Accordingly, in a case in which there are 5 total routing providers 108, 3% of the messages are allocated to each of the 4 secondary routing providers 108 (e.g., 12% total), while the remaining 88% of the messages are allocated to the optimal routing provider 108.

The message balancing module 218 selects whether a message is to be transmitted by the optimal routing provider 108 or the secondary routing providers 108 to meet the predefined allocation percentages. That is, the message balancing module 218 uses predefined allocation percentages to select whether a message request should be allocated the optimal routing provider 108 or the secondary routing providers 108. For example, given the above case, the message balancing module 218 allocates 12% of the messages to the secondary routing providers and the remaining 88% of the messages to the optimal routing provider 108.

The message balancing module 218 may allocate the messages according to the predefined allocation percentages in any of a variety of ways. For example, the message balancing module 218 may fulfill the predefined allocation percentages for each of the optimal routing provider 108 and secondary routing providers 108 in set chunks, such as by selecting 88 messages in a row to be allocated to the optimal routing provider 108 followed by 12 messages allocated to the secondary messages providers 108, and so forth. Alternatively, the message balancing module 218 may evenly intersperse the messages allocated to the secondary routing providers 108 throughout the messages allocated to the optimal routing provider 108, such as by allocated 1 out of every 8 or 9 messages to the secondary routing providers 108.

The message balancing module 218 provides an instruction to the routing provider selection module 222 indicating whether a message is to be allocated to the optimal routing provider 108 or one of the secondary routing providers 108. In turn, the routing provider selection module 222 selects the specific routing provider 108 to which each message is to be allocated. For example, if the message balancing module 218 determines that the message is to be allocated to the optimal routing provider 108, at operation 706 the routing provider selection module 222 determines the optimal routing provider 108. Alternatively, if the message balancing module 218 determines that the message is to be allocated to a secondary routing provider 108, at operation 708 the routing provider selection module 222 determines the second routing provider 108.

In either case, the routing provider selection module 222 instructs the message allocation module 210 to allocate the message to the selected routing provider 108. Accordingly, at operation 710, the message allocation module 210 allocates the message to the selected routing provider 108. For example, the message allocation module 210 communicates with the selected routing provider 108 to allocate the message for delivery. For example, the message allocation module 210 may provide the routing provider with the message (e.g., message payload), data identifying the intended recipient (e.g., phone number) and/or a specific route selected for use.

The message allocation module 210 may also generate a record for each message allocated to a routing provider 108. For example, the message allocation module 210 may generate a record in the feedback data storage 214 for each allocated message. The record may include data identifying the message, intended recipient, the routing provider 108 to which the message was allocated, a time at which the message was allocated, a route selected to transmit the message, and the like. The recorded data is used as feedback data for assessing performance of the routing providers 108.

Figure 8:
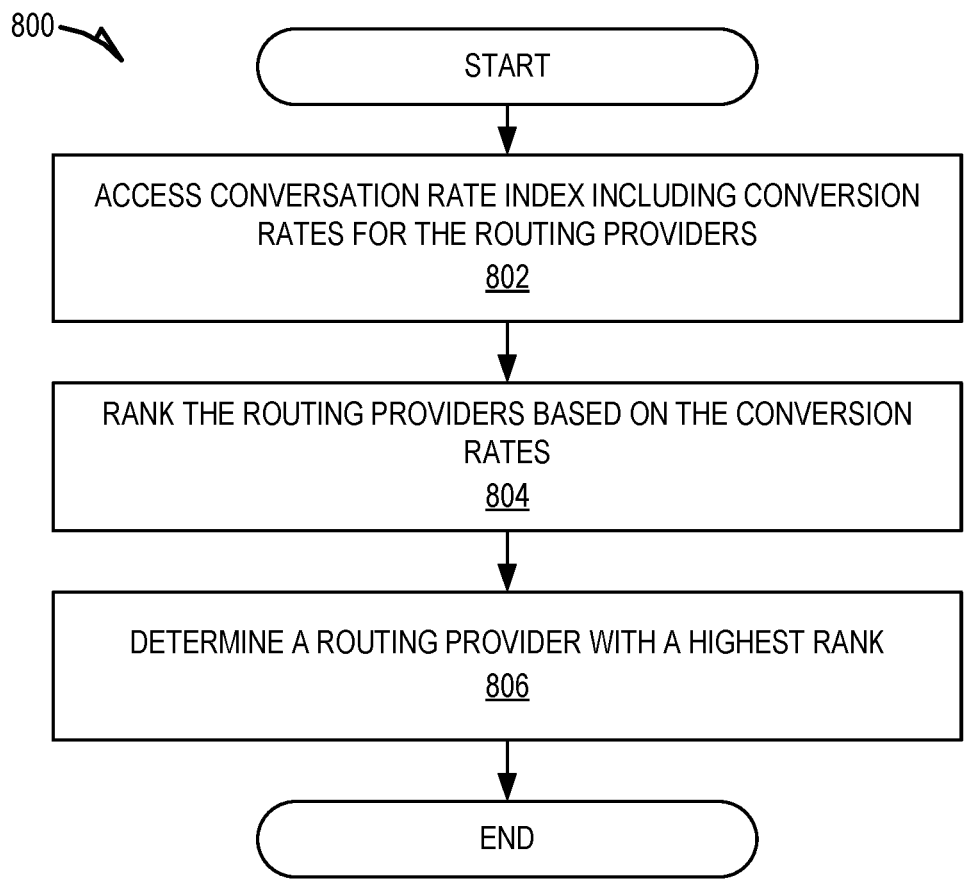
FIG. 8 is a flowchart showing a method for determining an optimal routing provider, according to some example embodiments.

FIG. 8 is a flowchart showing a method 800 for determining an optimal routing provider 108, according to some example embodiments. The method 800 may be embodied in computer readable instructions for execution by one or more processors such that the operations of the method 800 may be performed in part or in whole by the message routing optimization system 110; accordingly, the method 800 is described below by way of example with reference thereto. However, it shall be appreciated that at least some of the operations of the method 800 may be deployed on various other hardware configurations and the method 800 is not intended to be limited to the message routing optimization system 110.

At operation 802, the conversion rate index accessing module 220 accesses a conversion rate index including conversion rates for the routing providers 108. For example, the conversion rate index accessing module 220 accesses the conversion rate index from the conversion rate index storage 216 and provides the conversion rate index to the routing provider selection module 222. The conversion rate index accessing module 220 may perform this functionality at specified time intervals. For example, the conversion rate index accessing module 220 may access the conversion rate index at specified time intervals based on when the conversion rate index is updated by the conversion rate determination engine 202. Alternatively, the conversion rate index accessing module 220 may access the conversion rate index for each request received by the message optimization engine 208.

At operation 804, the routing provider selection module 222 ranks the routing providers 108 based on the conversion rates. For example, the routing provider selection module 222 may rank the routing providers 108 from the routing provider 108 with the highest conversion rate to the routing provider 108 with the lowest conversion rate.

At operation 806, the routing provider selection module 222 determines a routing provider 108 with the highest rank. The routing provider 108 with the highest rank is associated with the highest conversion rate. Accordingly, this routing provider 108 is the optimal routing provider 108 based on the conversion index.

Figure 9:
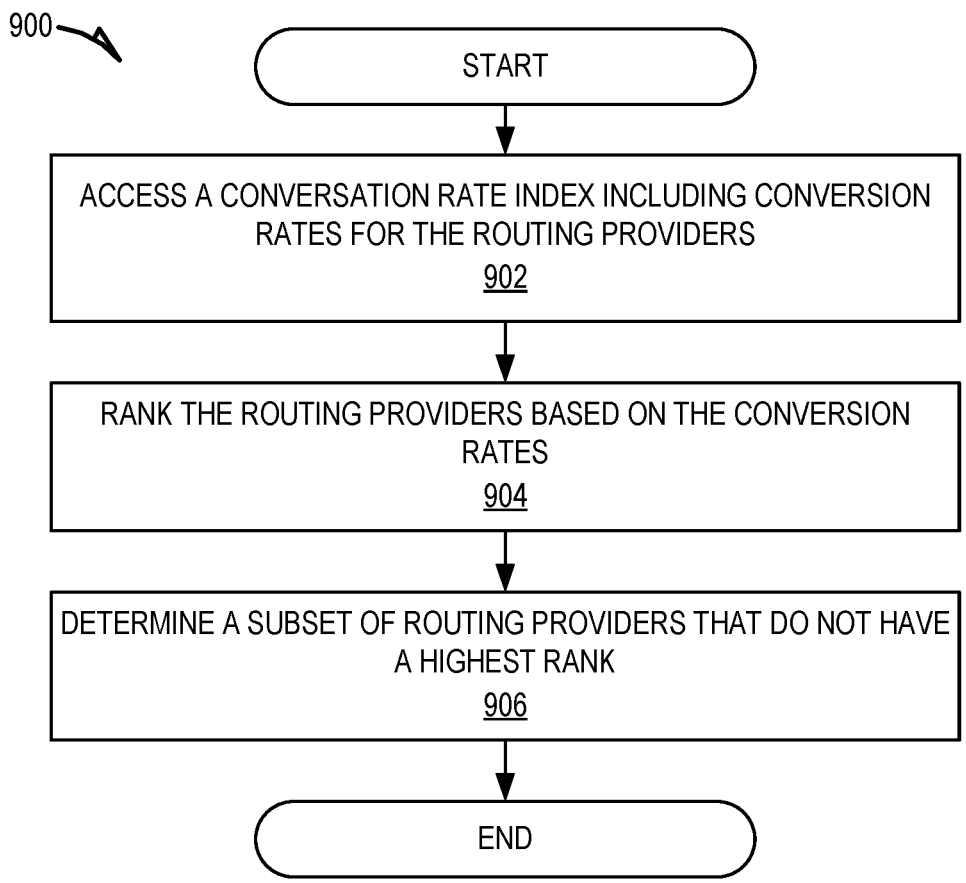
FIG. 9 is a flowchart showing a method for determining secondary routing providers, according to some example embodiments.

FIG. 9 is a flowchart showing a method 900 for determining secondary routing providers 108, according to some example embodiments. The method 900 may be embodied in computer readable instructions for execution by one or more processors such that the operations of the method 900 may be performed in part or in whole by the message routing optimization system 110; accordingly, the method 900 is described below by way of example with reference thereto. However, it shall be appreciated that at least some of the operations of the method 900 may be deployed on various other hardware configurations and the method 900 is not intended to be limited to the message routing optimization system 110.

At operation 902, the conversion rate index accessing module 220 accesses a conversion rate index including conversion rates for the routing providers 108. For example, the conversion rate index accessing module 220 accesses the conversion rate index from the conversion rate index storage 216 and provides the conversion rate index to the routing provider selection module 222. The conversion rate index accessing module 220 may perform this functionality at specified time intervals. For example, the conversion rate index accessing module 220 may access the conversion rate index at specified time intervals based on when the conversion rate index is updates by the conversion rate determination engine 202. Alternatively, the conversion rate index accessing module 220 may access the conversion rate index for each request received by the message optimization engine 208.

At operation 904, the routing provider selection module 222 ranks the routing providers 108 based on the conversion rates. For example, the routing provider selection module 222 may rank the routing providers 108 from the routing provider 108 with the highest conversion rate to the routing provider 108 with the lowest conversion rate.

At operation 906, the routing provider selection module 222 determines a subset of routing providers 108 that do not have a highest rank. The subset of routing provider 108 is the set of secondary routing providers 108. For example, the subset of routing providers 108 does not include the optimal routing provider 108.

Figure 10:
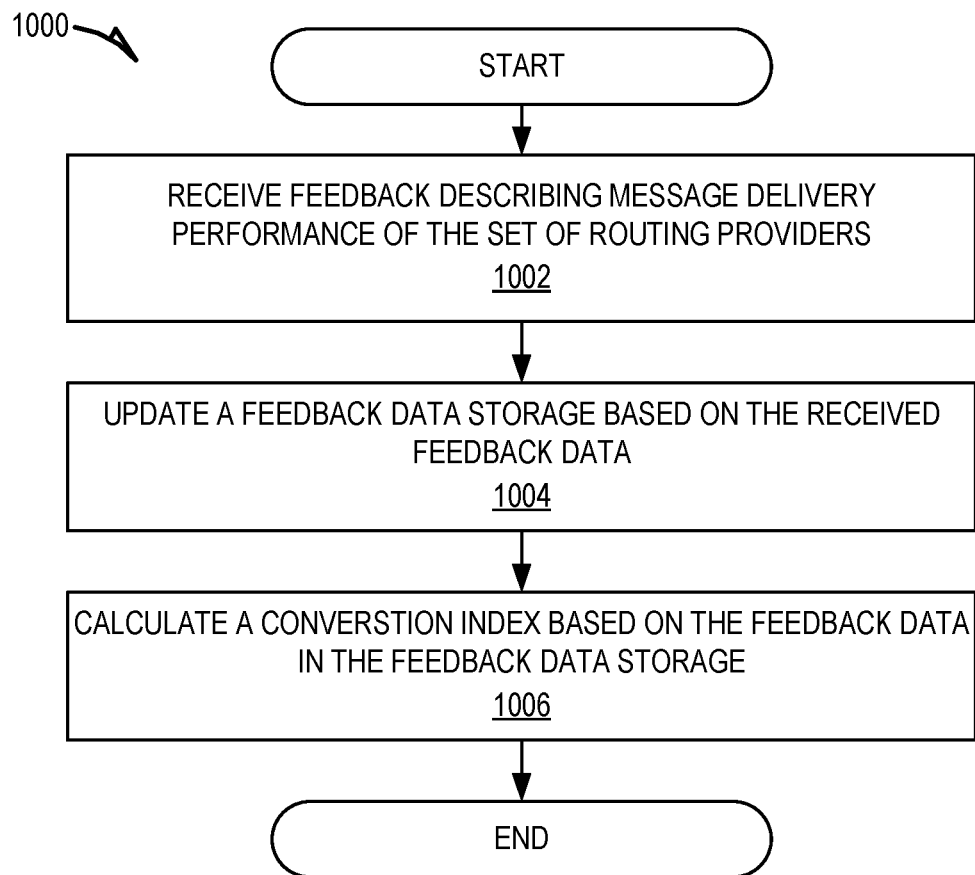
FIG. 10 is a flowchart showing a method for determining a conversion rate index, according to some example embodiments.

FIG. 10 is a flowchart showing a method 1000 for determining a conversion rate index, according to some example embodiments. The method 1000 may be embodied in computer readable instructions for execution by one or more processors such that the operations of the method 1000 may be performed in part or in whole by the message routing optimization system 110; accordingly, the method 1000 is described below by way of example with reference thereto. However, it shall be appreciated that at least some of the operations of the method 1000 may be deployed on various other hardware configurations and the method 1000 is not intended to be limited to the message routing optimization system 110.

At operation 1002, the feedback data receiving module 302 receives feedback describing message delivery performance of the set of routing providers. The feedback data may include both live feedback data and testing feedback data. Live feedback describes each routing provider's 108 performance delivering messages that have been allocated to the routing provider 108 by the message routing optimization system 110. For example, the live feedback data can include data describing whether the routing provider 108 transmitted the allocated message to its intended recipient, whether the message was successfully received by its intended recipient, whether the message resulted in a specified action by the recipient, an amount of time that elapsed until the message was transmitted by the routing provider, an amount of time that elapsed until the message was received by the recipient, and the like.

The testing feedback data describes the tested performance of the routing providers 108. For example, tests of a routing provider's network can be conducted during which test messages and/or synthetic messages are transmitted using routes provided by the routing provider 108. The testing feedback data describes the tracked performance of the test messages, such as whether the test messages were transmitted, received and/or resulted in a specified response, as well as the elapsed time for the test messages to be transmitted and/or received.

The feedback data receiving module 302 may receive the live feedback data from customer computing systems 106, routing providers 108, and or directly from recipient client devices 102. For example, a customer computing system 106 may elicit acknowledgements from the client devices 102, 104 to which the customer has sent messages. The acknowledgements indicate that a message transmitted to the client device 102 was received. The customer computing systems 106 may provide this live feedback data to the message routing optimization system 110, which is received by the feedback data receiving module 302. A routing provider 108 may similarly elicit live feedback data in relation to the messages transmitted by the routing provider 108, which the routing provider may provide to data to the message routing optimization system 110.

The feedback data receiving module 302 may also receive live feedback data directly from the recipient client devices 102, 104 to which the messages are directed. For example, the client devices 102, 104 may transmit acknowledgement messages directly to the message routing optimization system 110 indicating that the client device 102 received a message. The client devices 102, 104 may transmit the acknowledgement using an Application Programming Interface (API) command provided by the message routing optimization system 110. This type of feedback API allows the live feedback data to be transmitted directly to the message routing optimization system 110 from the client devices 102, 104, rather than through an intermediary system, such as a routing provider 108 and/or a customer computing system 106.

The feedback data receiving module 302 may receive testing feedback data from testing systems. The testing system run tests of the routing providers 108 networks during which test and/or synthetic messages are transmitted using various routes provided by the routing providers 108. The testing system tracks performance of the test messages, such as whether the test messages were transmitted, received and/or resulted in a specified response, the elapsed time for the test messages to be transmitted and/or received, etc. The testing system generates testing feedback data based on the tracked performance of the tests and provides the generated testing feedback data to the message routing optimization system 110.

At operation 1004, the feedback data receiving module 302 updates a feedback data storage 214 based on the received feedback data. For example, the feedback data receiving module 302 may update the feedback data storage 214 based on live feedback data and/or testing feedback data. To update the feedback data storage 214 based on live feedback data, the feedback data receiving module 302 may update the records in the feedback data storage 214 that were generated by the message allocation module 210. The message allocation module 210 generates a record in the feedback data storage 214 recording each message allocated by the message allocation module 210 to a routing provider 108 for delivery. The feedback data receiving module 302 updates the records based on the received live feedback data to indicate whether the transmitted message was successfully received by its intended recipient. The feedback data receiving module 302 updates the feedback data storage 214 based on testing feedback data by storing the testing feedback data in the feedback data storage 214.

At operation 1006, the conversion rate calculation module 306 calculates a conversion index based on the feedback data in the feedback data storage. The conversion rate calculation module 306 may use any of a variety of algorithms to calculate the conversion rates. For example, the conversion rate for a routing provider 108 may be based on a percentage of the messages transmitted by routing provider 108 that were successfully delivered. In this type of embodiment, the conversion rate calculation module 306 may use the feedback data for each routing provider 108 to determine a total number of messages allocated to the routing provider 108 and a total number of messages successfully delivered by the routing provider 108, and use the determined values to calculate the percentage of the allocated messages that were successfully delivered by the routing provider 108.

In some embodiments, the conversion rates determined for each routing provider 108 may be an upper confidence bound estimate. An upper confidence bound estimate provides an optimistic estimate (e.g., most optimistic conversion rate) of the performance of each routing provider 108 based on the amount feedback data available. As the upper confidence bound estimate is based on available feedback data, the upper confidence bound estimate for routing providers 108 with limited feedback data will be amplified due to the limited amount feedback data available. For example, the upper confidence bound estimate for a routing provider 108 with limited feedback may initially start very high, however will normalize as additional feedback data is gathered.

Using the upper confidence bound estimate encourages exploration by the message routing optimization system 110, as messages will be allocated to routing providers 108 with limited feedback data, resulting in better estimates in the performance of each routing provider 108 over time.

The conversion rate calculation module 306 may calculate conversion rates for each routing provider 108 as well as for the individual routes provided by the routing providers 108. For example, the conversion rate calculation module 306 may use a subset of the feedback data pertaining to each provided route to calculate a conversion rate for the route. Calculating conversion rates for the routes provides a greater level of granularity when allocating the messages to optimize performance.

The conversion rate calculation module 306 updates the conversion rate index based on the updated conversion rates. The conversion rate index is stored in the conversion rate index storage 216. Accordingly, the conversion rate calculation module 306 communicates with the conversion rate index storage 216 to update the conversion rate index based on the conversion rates calculated for the routing providers 108.

Software Architecture

Figure 11:
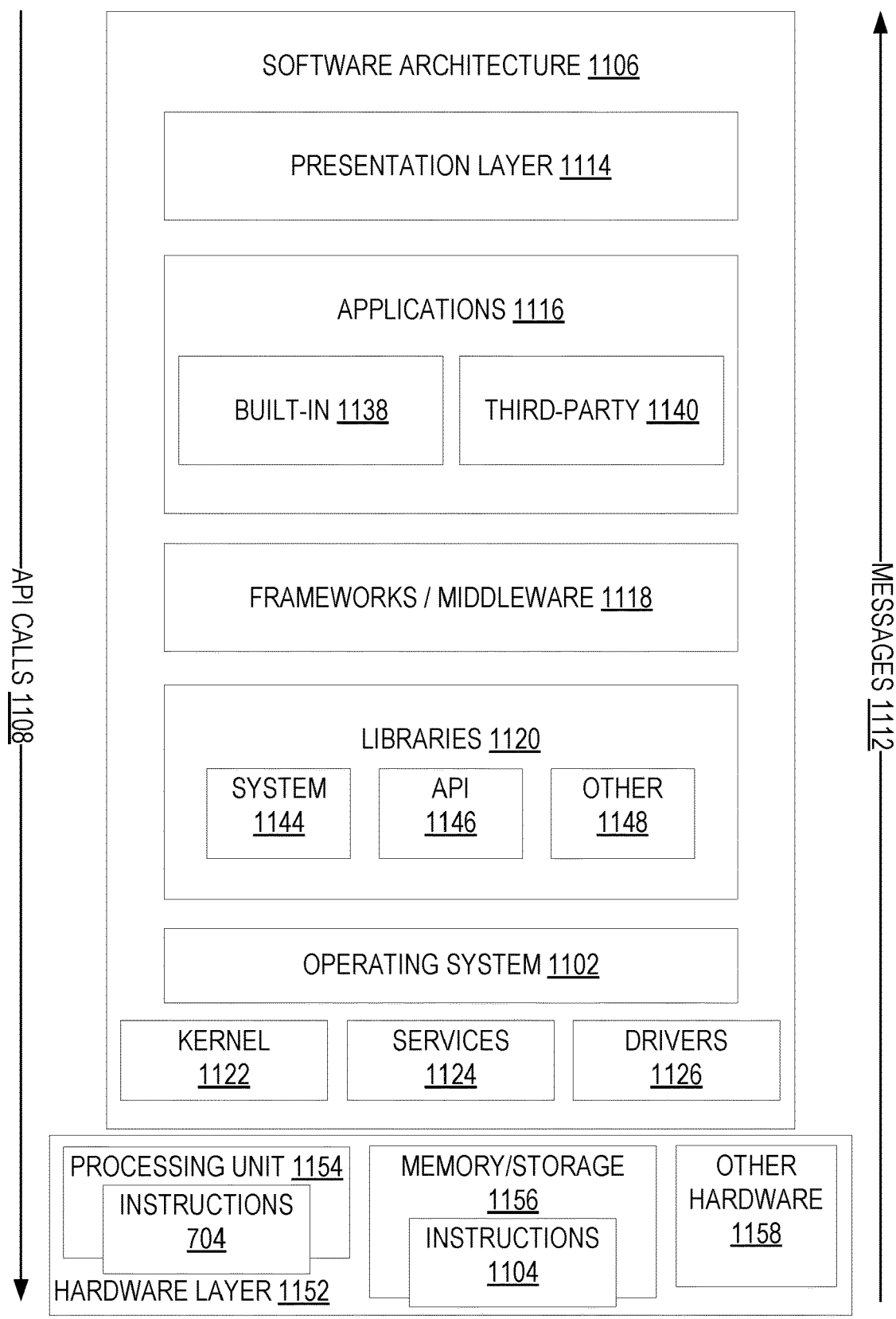
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating an example software architecture 1106, which may be used in conjunction with various hardware architectures herein described. FIG. 11 is a non-limiting example of a software architecture 1106 and it will be appreciated that many other architectures may be implemented to facilitate the functionality described herein. The software architecture 1106 may execute on hardware such as machine 1200 of FIG. 12 that includes, among other things, processors 1204, memory 1214, and (input/output) I/O components 1218. A representative hardware layer 1152 is illustrated and can represent, for example, the machine 1200 of FIG. 12. The representative hardware layer 1152 includes a processing unit 1154 having associated executable instructions 1104. Executable instructions 1104 represent the executable instructions of the software architecture 1106, including implementation of the methods, components, and so forth described herein. The hardware layer 1152 also includes memory and/or storage modules 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, frameworks/middleware 1118, applications 1116, and a presentation layer 1114. Operationally, the applications 1116 and/or other components within the layers may invoke application programming interface (API) calls 1108 through the software stack and receive a response such as messages 1112 in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124, and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124, and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphical user interface (GUI) functions, high-level resource management, high-level location services, and so forth. The frameworks/middleware 1118 may provide a broad spectrum of other APIs that may be used by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124, and/or drivers 1126), libraries 1120, and frameworks/middleware 1118 to create UIs to interact with users of the system. Alternatively, or additionally, in some systems, interactions with a user may occur through a presentation layer, such as presentation layer 1114. In these systems, the application/component "logic" can be separated from the aspects of the application/component that interact with a user.

Figure 12:
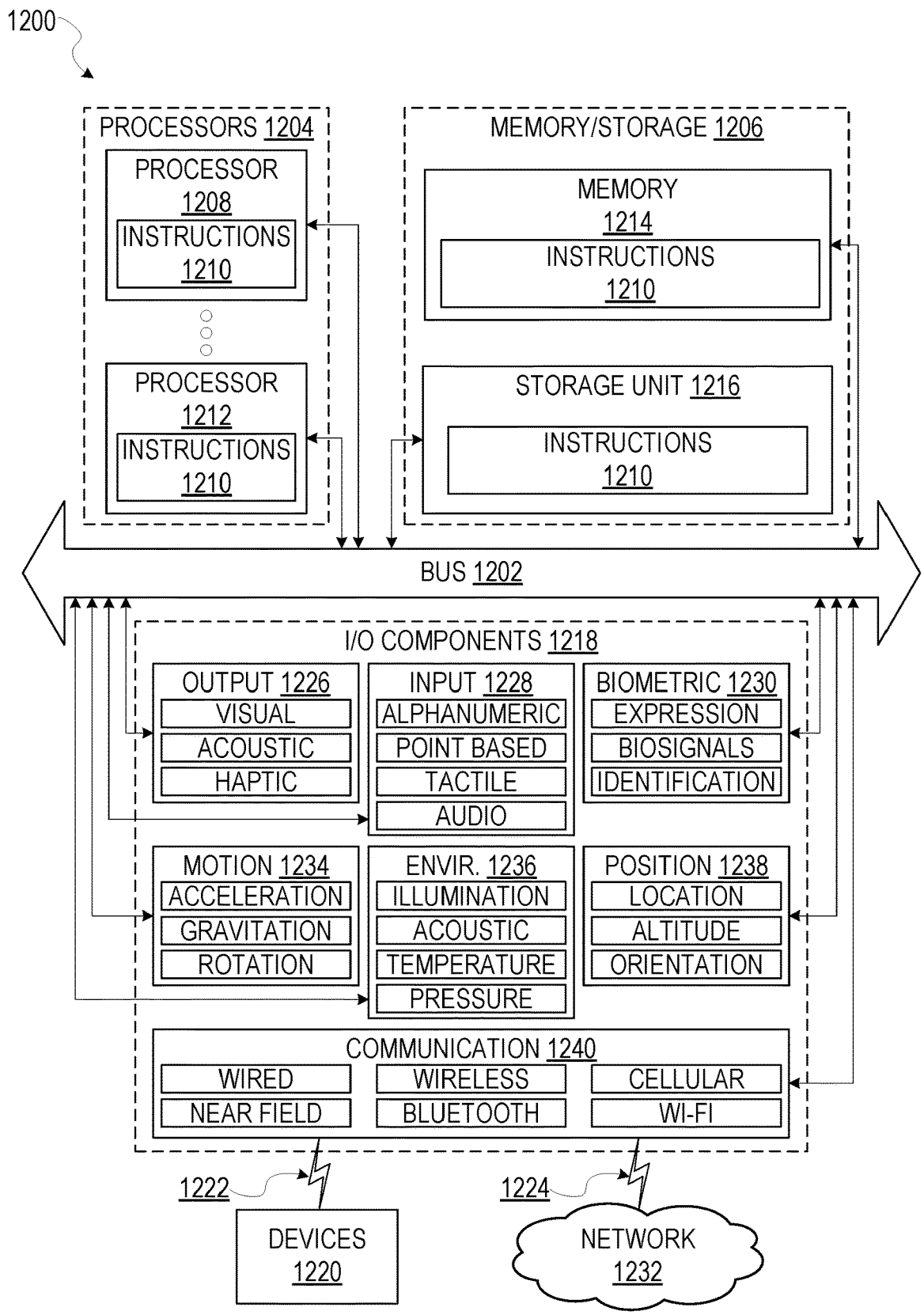
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions 1104 from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1200 capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204

(e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environmental components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1238 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1224 and coupling 1222, respectively. For example, the communication components 1240 may include a network interface component or other suitable device to interface with the network 1232. In further examples, communication components 1240 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a USB).

Moreover, the communication components 1240 may detect identifiers or include components operable to detect identifiers. For example, the communication components 1240 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1210 for execution by the machine 1200, and includes digital or analog communications signals or other intangible medium to facilitate communication of such instructions 1210. Instructions 1210 may be transmitted or received over the network 1232 using a transmission medium via a network interface device and using any one of a number of well-known transfer protocols.

"CLIENT DEVICE" in this context refers to any machine 1200 that interfaces to a communications network 1232 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1232.

"COMMUNICATIONS NETWORK" in this context refers to one or more portions of a network 1232 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1232 or a portion of a network 1232 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1210 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1210. The term "machine-readable medium" shall also be taken to include any medium, or combination of multiple media, that is capable of storing instructions 1210 (e.g., code) for execution by a machine 1200, such that the instructions 1210, when executed by one or more processors 1204 of the machine 1200, cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1204) may be configured by software (e.g., an application 1116 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1204 or other programmable processor 1204. Once configured by such software, hardware components become specific machines 1200 (or specific components of a machine 1200) uniquely tailored to perform the configured functions and are no longer general-purpose processors 1204. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1204 configured by software to become a special-purpose processor, the general-purpose processor 1204 may be configured as respectively different special-purpose processors (e.g., comprising different hardware components) at different times. Software accordingly configures a particular processor or processors 1204, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1202) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1204 that are temporarily configured (e.g., by software) or permanently configured to perform the relevant operations. Whether temporarily or permanently configured, such processors 1204 may constitute processor-implemented components that operate to perform one or more operations or functions described herein. As used herein, "processor-implemented component" refers to a hardware component implemented using one or more processors 1204. Similarly, the methods described herein may be at least partially processor-implemented, with a particular processor or processors 1204 being an example of hardware. For example, at least some of the operations of a method may be performed by one or more processors 1204 or processor-implemented components. Moreover, the one or more processors 1204 may also operate to support performance of the relevant operations in a "cloud computing" environment or as a "software as a service" (SaaS). For example, at least some of the operations may be performed by a group of computers (as examples of machines 1200 including processors 1204), with these operations being accessible via a network 1232 (e.g., the Internet) and via one or more appropriate interfaces (e.g., an API). The performance of certain of the operations may be distributed among the processors 1204, not only residing within a single machine 1200, but deployed across a number of machines 1200. In some example embodiments, the processors 1204 or processor-implemented components may be located in a single geographic location (e.g., within a home environment, an office environment, or a server farm). In other example embodiments, the processors 1204 or processor-implemented components may be distributed across a number of geographic locations.

"PROCESSOR" in this context refers to any circuit or virtual circuit (a physical circuit emulated by logic executing on an actual processor 1204) that manipulates data values according to control signals (e.g., "commands," "op codes," "machine code," etc.) and which produces corresponding output signals that are applied to operate a machine 1200. A processor 1204 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1204 may further be a multi-core processor having two or more independent processors 1204 (sometimes referred to as "cores") that may execute instructions 1210 contemporaneously.

What is claimed is:

1. A method comprising:
   receiving a first request to transmit a first message to a first recipient device;
   determining to allocate the first message for exploitation;
   in response to determining to allocate the first message for exploitation:
      determining, based on a ranking of a set of routing providers, that a first routing provider is an optimal routing provider, the ranking having been determined based on a conversion rate index including individual conversion rates for each routing provider in the set of routing providers; and
      allocating the first message to the first routing provider for delivery to the first recipient device;
   receiving a second request to transmit a second message to a second recipient device;
   determining to allocate the second message for exploration;
   in response to determining to allocate the second message for exploration:
      identifying, based on the ranking of the set of routing providers, a set of secondary routing providers, the set of secondary routing providers not including the first routing provider; and
      allocating the second message to a secondary routing provider from the set of secondary routing providers for delivery to the second recipient device.

2. The method of claim 1, wherein determining that the first routing provider is the optimal routing provider comprises:
   determine, based on the ranking of the set of routing providers, that the first routing provider is ranked highest.

3. The method of claim 1, further comprising:
   receiving a third request to transmit a third message to a third recipient device;
   determining to allocate the third message for exploitation; and
   in response to determining to allocate the third message for exploitation:
      determining, based on an updated ranking of the set of routing providers, that a second routing provider is the optimal routing provider; and
      allocating the third message to the second routing provider to be delivered to the third recipient device.

4. The method of claim 1, wherein the individual conversion rates for each routing provider in the set of routing providers are upper confidence bound estimates determined based on available feedback data for each routing provider.

5. The method of claim 1, further comprising:
   receiving feedback data describing message delivery performance of the set of routing providers; and
   determining individual conversion rates for each routing provider in the set of routing providers based on the feedback data.

6. The method of claim 5, wherein the feedback data includes live feedback describing message delivery performance when transmitting messages that have been allocated to the set of routing providers, and testing feedback data describing message delivery performance when transmitting test messages using routes provided by the set of routing providers.

7. The method of claim 1, wherein determining to allocate the first message as an exploitation message is based on predetermined message allocation percentages.

8. The method of claim 1, wherein messages for exploration are divided evenly among the set of secondary routing providers.

9. The method of claim 1, wherein more messages are allocated for exploitation than for exploration.

10. A system comprising:
    one or more computer processors; and
    one or more computer-readable mediums storing instructions that, when executed by the one or more computer processors, cause the system to perform operations comprising:
       receiving a first request to transmit a first message to a first recipient device;
       determining to allocate the first message for exploitation;
       in response to determining to allocate the first message for exploitation:
          determining, based on a ranking of a set of routing providers, that a first routing provider is an optimal routing provider, the ranking having been determined based on a conversion rate index including individual conversion rates for each routing provider in the set of routing providers; and allocating the first message to the first routing provider to be delivered to the first recipient device;

receiving a second request to transmit a second message to a second recipient device;

determining to allocate the second message for exploration;

in response to determining to allocate the second message for exploration:

identifying, based on the ranking of the set of routing providers, a set of secondary routing providers, the set of secondary routing providers not including the first routing provider; and allocating the second message to a secondary routing provider from the set of secondary routing providers for delivery to the second recipient device.

11. The system of claim 10, wherein determining that the first routing provider is the optimal routing provider comprises:

determine, based on the ranking of the set of routing providers, that the first routing provider is ranked highest.

12. The system of claim 10, the operations further comprising:

receiving a third request to transmit a third message to a third recipient device;

determining to allocate the third message for exploitation; and in response to determining to allocate the third message for exploitation:

determining, based on an updated ranking of the set of routing providers, that a third routing provider is the optimal routing provider; and allocating the third message to the second routing provider to be delivered to the third recipient device.

13. The system of claim 10, wherein the individual conversion rates for each routing provider in the set of routing providers are upper confidence bound estimates determined based on available feedback data for each routing provider.

14. The system of claim 10, the operations further comprising:

receiving feedback data describing message delivery performance of the set of routing providers; and determining individual conversion rates for each routing provider in the set of routing providers based on the feedback data.

15. The system of claim 14, wherein the feedback data includes live feedback describing message delivery performance when transmitting messages that have been allocated to the set of routing providers, and testing feedback data describing message delivery performance when transmitting test messages using routes provided by the set of routing providers.

16. The system of claim 10, wherein determining to allocate the first message as an exploitation message is based on predetermined message allocation percentages.

17. A non-transitory computer-readable medium storing instructions that, when executed by one or more computer processors of one or more computing devices, cause the one or more computing devices to perform operations comprising:

receiving a first request to transmit a first message to a first recipient device;

determining to allocate the first message for exploitation;

in response to determining to allocate the first message for exploitation:

determining, based on a ranking of a set of routing providers, that a first routing provider is an optimal routing provider, the ranking having been determined based on a conversion rate index including individual conversion rates for each routing provider in the set of routing providers; and allocating the first message to the first routing provider to be delivered to the first recipient device;

receiving a second request to transmit a second message to a second recipient device;

determining to allocate the second message for exploration;

in response to determining to allocate the second message for exploration:

identifying, based on the ranking of the set of routing providers, a set of secondary routing providers, the set of secondary routing providers not including the first routing provider; and allocating the second message to a secondary routing provider from the set of secondary routing providers for delivery to the second recipient device.

18. The non-transitory computer-readable medium of claim 17, wherein determining that the first routing provider is the optimal routing provider comprises:

determine, based on the ranking of the set of routing providers, that the first routing provider is ranked highest.

19. The non-transitory computer-readable medium of claim 17, the operations further comprising:

receiving a third request to transmit a third message to a third recipient device;

determining to allocate the third message for exploitation; and in response to determining to allocate the third message for exploitation:

determining, based on an updated ranking of the set of routing providers, that a third routing provider is the optimal routing provider; and allocating the third message to the third routing provider to be delivered to the third recipient device.

20. The non-transitory computer-readable medium of claim 17, wherein determining to allocate the first message for exploitation is based on predetermined message allocation percentages.

* * * * *